US006982306B2

(12) United States Patent
Martin et al.

(10) Patent No.: US 6,982,306 B2
(45) Date of Patent: Jan. 3, 2006

(54) STANNOXY-SUBSTITUTED METALLOCENE CATALYSTS FOR OLEFIN AND ACETYLENE POLYMERIZATION

(75) Inventors: Joel L. Martin, Bartlesville, OK (US); Michael D. Jensen, Bartlesville, OK (US); Max P. McDaniel, Bartlesville, OK (US)

(73) Assignee: Chevron Phillips Chemical Company, L.P., The Woodland, TX (US)

( * ) Notice: Subject to any disclaimer, the term of this patent is extended or adjusted under 35 U.S.C. 154(b) by 52 days.

(21) Appl. No.: 10/723,350

(22) Filed: Nov. 26, 2003

(65) Prior Publication Data

US 2005/0113245 A1 May 26, 2005

(51) Int. Cl.
*C08F 4/58* (2006.01)
(52) U.S. Cl. ............... 526/166; 526/160; 526/170; 526/129; 526/134; 502/103; 502/104; 556/52; 556/84; 556/87
(58) Field of Classification Search ............... 556/52, 556/84, 87; 502/103, 104; 526/166, 160, 526/170, 129, 134
See application file for complete search history.

(56) References Cited

U.S. PATENT DOCUMENTS

| | | | |
|---|---|---|---|
| 3,334,119 A | 8/1967 | Cohen | |
| 3,431,288 A | 3/1969 | Gibbons et al. | |
| 3,541,215 A | 11/1970 | DeMarco et al. | |
| 3,952,105 A | 4/1976 | Dorschner | |
| 4,978,730 A * | 12/1990 | Maezawa et al. | 526/153 |
| 5,196,490 A * | 3/1993 | Campbell et al. | 526/160 |
| 5,258,475 A | 11/1993 | Kissin | |
| 5,326,837 A * | 7/1994 | Kissin | 526/150 |
| 5,340,892 A * | 8/1994 | Kuramoto | 526/119 |
| 5,631,335 A | 5/1997 | Alt et al. | |
| 5,637,744 A | 6/1997 | Alt et al. | |
| 5,721,327 A * | 2/1998 | Santi et al. | 526/133 |
| 5,726,332 A | 3/1998 | Eisch et al. | |
| 5,789,638 A * | 8/1998 | Hahn et al. | 585/275 |
| 5,906,955 A | 5/1999 | Hamura et al. | |
| 5,919,983 A | 7/1999 | Rosen et al. | |
| 5,942,459 A | 8/1999 | Sugano et al. | |
| 5,962,362 A * | 10/1999 | Wasserman et al. | 502/117 |
| 6,020,439 A * | 2/2000 | Ko et al. | 525/338 |
| 6,034,187 A | 3/2000 | Maehama et al. | |
| 6,037,442 A | 3/2000 | Proulx et al. | |
| 6,069,109 A | 5/2000 | Kao et al. | |
| 6,107,230 A * | 8/2000 | McDaniel et al. | 502/104 |
| 6,159,889 A * | 12/2000 | Wasserman | 502/125 |
| 6,165,929 A | 12/2000 | McDaniel et al. | |
| 6,271,322 B1 * | 8/2001 | McCullough et al. | 526/160 |
| 6,340,652 B1 | 1/2002 | Sugano et al. | |
| 6,410,657 B1 * | 6/2002 | Ko et al. | 525/338 |
| 6,531,550 B1 | 3/2003 | McDaniel et al. | |
| 6,825,369 B1 * | 11/2004 | Stevens et al. | 556/7 |

FOREIGN PATENT DOCUMENTS

| | | |
|---|---|---|
| BE | 635987 | 2/1964 |
| DE | 1105416 | 4/1961 |
| EP | 0683180 A2 | 11/1995 |
| EP | 0741146 A1 | 11/1996 |
| EP | 0775712 A1 | 5/1997 |
| EP | 0780405 A1 | 6/1997 |
| EP | 0788220 A1 | 7/1997 |
| EP | 0838481 A1 | 4/1998 |
| EP | 0861853 A1 | 9/1998 |
| EP | 0927201 B1 | 7/1999 |
| EP | 0927201 B1 | 4/2004 |
| JP | 11279189 A2 | 10/1999 |
| SU | 300478 | 4/1971 |
| TW | 386090 | 4/2000 |
| WO | WO 9960033 A1 | 11/1999 |
| WO | WO 02077043 A1 | 10/2002 |
| WO | WO 04055061 A1 | 7/2004 |

OTHER PUBLICATIONS

Silva et al. Polyhedron, 1999, 18(22), 2823-2826 (abstract only).*
Herrmann et al. J. Organomet. Chem., 1989, 362(1-2), C5-C7 (abstract only).*
Gorsich, Richard D., "Preparation and Properties of Cyclopentadienyltitanium Trichloride," 15th Southwest Regional Meeting of the American Chemical Society, Dec. 3, 1959, pp. 4211-4214, vol. 82, Baton Rouge, USA.
Suzuki, Hideo and Takiguchi, Toshio, "Preparation and Some Properties of Triogranosiloxy Derivatives of Cyclopentadienyl Titanium", Bulletin Of The Chemical Society Of Japan, 1975, pp. 2460-2461, vol. 48(9), Japan.
Dickson, R. S. and West, B. O., "The Reaction Of Alkali Metal Derivatives Of Group IV Metal Alkyls With Bis (Cyclopentadienyl) Titanium(IV) Dichloride," Australian Journal Of Chemistry, 1961, vol. 14, pp. 555-561, Melbourne, Australia.

(Continued)

*Primary Examiner*—David W. Wu
*Assistant Examiner*—Rip A. Lee
(74) *Attorney, Agent, or Firm*—Womble Carlyle Sandridge & Rice, PLLC

(57) ABSTRACT

This invention relates to the field of olefin polymerization catalyst compositions, and methods for the polymerization and copolymerization of olefins, including polymerization methods using a catalyst composition. One aspect of this invention is the formation and use of a catalyst composition comprising a stannoxy-substituted half-sandwich metallocene and an activator for olefin polymerization processes. For example, this invention encompasses the preparation of $(\eta^5\text{-}C_5H_5)Ti(OSnPh_3)Cl_2$, its contact with an activator, for example, zinc-impregnated chlorided alumina, to form a catalyst composition, and the use of this catalyst composition for polymerizing olefins or acetylenes.

26 Claims, 1 Drawing Sheet

OTHER PUBLICATIONS

Nomura, Kotohiro; Naga, Naofumi; Miki, Misao; Yanagi, Kazunori; and Imai, Akio, "Synthesis Of Various Non-bridged Titanium(IV) Cyclopentadienyl-Aryloxy Complexes Of The Type CpTi(OAr)X$_2$ And Their Use In The Catalysis Of Alkene Polymerization. Important Roles Of Substituents on Both Aryloxy And Cyclopentadienyl Groups," Organometallics, 1998, pp. 2152-2154, vol. 17, No. 11, American Chemical Society, USA.

Köppl, Alexander; Alt, Helmut G., "Heterogeneous Metallocene Catalysts For Ethylene Ploymerization," Journal of Molecular Catalysis A: Chemical, 2001, pp. 23-32, vol. 165, Elsevier, The Netherlands.

Kajigaeshi, Shoji; Kadowaki, Toshiya; Nishida, Akiko; and Fujisaki, Shizuo, "Selective Preparation of Fluorene Derivatives Using the t-Butyl Function as a Positional Protective Group," Bull. Chem. Soc. Jpn., 1986, pp. 97-103, vol. 59, The Chemical Society of Japan, Japan.

Alt, Helmut, G.; Jung, Michael; Kehr, Gerald, "C$_1$-verbrückte Fluorenyliden-Indenylidenkomplese des Typs (C$_{13}$H$_8$-CR$_2$-C$_9$H$_{6-n}$R'$_n$)ZrCl$_2$ (n=0, 1; R=Me, Ph, Butenyl; R'=Alkyl, Alkenyl) als Metallocenkatalysatorvorstufen für die Ethylenpolymerisation," Journal of Organometallic Chemistry, 1998, pp. 153-181, vol. 562, Elsevier, Spain.

Alt, Helmut, G.; Jung, Michael "C$_1$-Bridged Fluorenylidene Cyclopentadienylidene Compleses of the Type (C$_{13}$H$_8$-CR$^1$R$^2$-C$_5$H$_3$R)ZrCl$_2$ (R$^1$R$^2$=alkyl, phenyl, alkenyl; R=H, alkyl, alkenyl, substituted silyl) as Catalyst Precursors for the Polymerization of Ethylene and Propylene," Journal of Organometallic Chemistry, 1998, pp. 87-112, vol. 568, Elsevier, Spain.

Babitskii, B. D.; Golenko, T. G.; Dolgoplosk, B. A.; Kormer, V. A.; Skoblikova, V.I.; Tinyakova, E.I., "Stereospecific Ploymerization of Butadiene in the Presence of Catalyst Systems Based on π-cyclopentadienyl Complexes of Nickel," Doklady Adakemii Nauk SSSR, 1965, pp. 836-838, vol. 161(4), S.V. Lebedev All-Union Synth. Rubber Res. Inst., Leningrad Russia.

\* cited by examiner

STANNOXY-SUBSTITUTED METALLOCENE CATALYSTS FOR OLEFIN AND ACETYLENE POLYMERIZATION

TECHNICAL FIELD OF THE INVENTION

This invention relates to the field of organometal compositions, olefin polymerization catalyst compositions, methods for the polymerization and copolymerization of olefins using a catalyst composition, and polyolefins.

BACKGROUND OF THE INVENTION

It is known that olefins, including ethylene, can be polymerized with catalyst compositions employing titanium, zirconium, vanadium, chromium or other metals, impregnated on a variety of support materials, often in the presence of cocatalysts. These catalyst compositions may be useful for both homopolymerization of ethylene, as well as copolymerization of ethylene with comonomers such as propylene, 1-butene, 1-hexene, or other higher $\alpha$-olefins. Therefore, there exists a constant search to develop new olefin polymerization catalysts, catalyst activation processes, and methods of making and using catalysts, that will provide enhanced catalytic activities and polymeric materials tailored to specific end uses.

One type of catalyst system comprises organometal compounds, particularly metallocene compounds. A special class of metallocenes that has been little explored are the half-sandwich metallocenes, which contain only a single $\eta^5$-cyclopentadienyl-type ring system. It is believed that such compounds may offer the potential for higher activity and better comonomer incorporation. Also of interest is the development of metallocene-based catalytic systems that can be activated with a variety of activating agents without requiring relatively expensive methylaluminoxane, yet still provide relatively high polymerization activities.

Therefore, what are needed are new catalyst compositions and methods of making the catalyst compositions that afford high polymerization activities, and will allow polymer properties to be maintained within the desired specification ranges.

SUMMARY OF THE INVENTION

This invention comprises catalyst compositions, methods for preparing catalyst compositions, and methods for polymerizing olefins and acetylenes using the catalyst compositions disclosed herein. In the course of examining metallocene olefin polymerization catalysts, the preparation and properties of new half-sandwich metallocene compounds were investigated. It was discovered that half-sandwich metallocene compounds can be contacted with an activator to form a catalyst composition for the polymerization of olefins and acetylenes. The present invention encompasses new compounds, new compositions of matter, and new catalyst compositions comprising half-sandwich metallocene compounds of the following general formula:

$(X^1)(X^2)(X^3)(X^4)M^1$; wherein $M^1$ is selected from titanium, zirconium, or hafnium;

$(X^1)$ is selected from cyclopentadienyl, indenyl, fluorenyl, substituted cyclopentadienyl, substituted indenyl, or substituted fluorenyl;

each substituent on the substituted cyclopentadienyl, substituted indenyl, or substituted fluorenyl $(X^1)$ is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen;

$(X^2)$ is selected from a stannoxy group with the following formula:

—OSnR$_3$;

wherein R is independently selected from alkyl, cycloalkyl, aryl, aralkyl, substituted alkyl, substituted aryl, or substituted aralkyl, any one of which having from 1 to about 20 carbon atoms; OR' wherein R' is selected from alkyl, aryl, aralkyl, substituted alkyl, substituted aryl, or substituted aralkyl, any one of which having from 1 to about 20 carbon atoms; F; Cl; Br; or I; and $(X^3)$ and $(X^4)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide.

In one aspect, the catalyst composition of this invention comprises an activator. Several different activators may be used to activate the half-sandwich metallocenes of this invention including, but not limited to, an aluminoxane, an organoboron compound, an ionizing ionic compound, an ion-exchangeable layered compound exchanged with an electron-withdrawing anion, a chemically-treated solid oxide combined with an organoaluminum compound, or a mixture of any or all of these activator components.

In another aspect of this invention, the activator comprises a chemically-treated solid oxide, which comprises a solid oxide treated with an electron-withdrawing anion. In yet another aspect of this invention, the activator comprises a chemically-treated solid oxide in combination with an organoaluminum compound.

In still another aspect, the catalyst composition of this invention comprises:

a) a half-sandwich metallocene compound;

b) a chemically-treated solid oxide comprising a solid oxide treated with an electron-withdrawing anion, wherein the solid oxide is selected from silica, alumina, silica-alumina, aluminum phosphate, heteropolytungstates, titania, zirconia, magnesia, boria, zinc oxide, mixed oxides thereof, or mixtures thereof; and the electron-withdrawing anion is selected from fluoride, chloride, bromide, phosphate, triflate, bisulfate, sulfate, or combinations thereof; and c) an organoaluminum compound with the following formula:

Al(X$^5$)$_n$(X$^6$)$_{3-n}$;

wherein $(X^5)$ is a hydrocarbyl having from 1 to about 20 carbon atoms; $(X^6)$ is selected from alkoxide or aryloxide, any one of which having from 1 to about 20 carbon atoms, halide, or hydride; and n is a number from 1 to 3, inclusive.

In another aspect of this invention, for example, the half-sandwich metallocene compound CpTi(OSnPh$_3$)Cl$_2$, where Cp=$\eta^5$-C$_5$H$_5$, is prepared and is employed along with triisobutylaluminum cocatalyst and a chemically-treated solid oxide comprising fluorided silica-alumina, sulfated alumina, or chlorided alumina. Further, the chemically-treated solid oxide optionally contains another metal or metal ion, including but not limited to, zinc. As used herein the chemically-treated solid oxide is also termed an "activator-support", of which fluorided silica-alumina, sulfated, and chlorided alumina are examples. Not wishing to be bound by theory, it is believed that the acidic activator-support is not merely an inert support component of the catalyst composition, but is involved in effecting the observed catalytic chemistry.

This invention also encompasses methods of making catalyst compositions that comprise contacting at least one half-sandwich metallocene compound and an activator, including but not limited to, an organoaluminum compound combined with a chemically-treated solid oxide. These methods also comprise contacting the half-sandwich metallocene catalyst, the organoaluminum cocatalyst, and the chemically-treated solid oxide, and optionally pretreating some or all of these components with an olefin or acetylene compound, prior to initiating the polymerization reaction.

The present invention further comprises methods for polymerizing olefins comprising contacting at least one olefin monomer and a catalyst composition under polymerization conditions to produce the polymer.

Another aspect of this invention is the polyolefins described herein.

This invention also encompasses an article that comprises the polymer produced with the catalyst composition of this invention.

These and other features, aspects, embodiments, and advantages of the present invention will become apparent after a review of the following detailed description of the disclosed features.

DETAILED DESCRIPTION OF THE INVENTION

Figure 1:
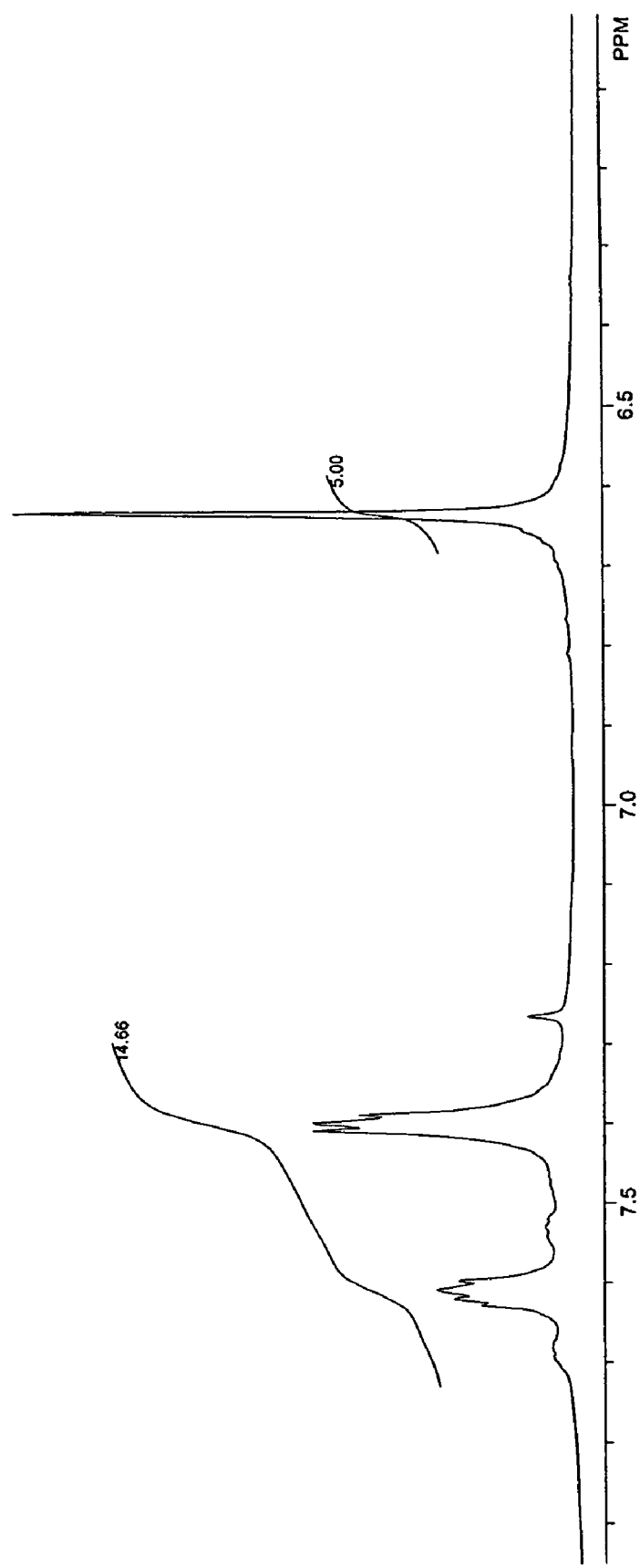
FIG. 1 illustrates the $^1$H NMR spectrum of the half-sandwich metallocene compound ($\eta^5$-C$_5$H$_5$)Ti(OSnPh$_3$)Cl$_2$, recorded in CDCl$_3$ solvent at 300 MHz.

The present invention provides new catalyst compositions, methods for preparing catalyst compositions, and methods for using the catalyst compositions to polymerize olefins and acetylenes. In accordance with this invention, the catalyst composition comprises at least one half-sandwich metallocene compound and an activator. The activator of this invention is typically selected from an aluminoxane, an organoboron compound, an ionizing ionic compound, a clay material, a chemically-treated solid oxide combined with an organoaluminum compound, or any combination thereof.

In accordance with this invention, when the activator is a combination or mixture of a chemically-treated solid oxide and an organoaluminum compound, the solid oxide has been treated with an electron-withdrawing anion from an ionic or molecular species, or from a source compound of any type, and optionally treated with another metal in addition to an electron-withdrawing anion.

Catalyst Composition—The Half-Sandwich Metallocene

The present invention provides new compounds, new compositions of matter, new catalyst compositions comprising half-sandwich metallocene compounds, new methods for preparing catalyst compositions and new methods for polymerizing olefins. In one aspect, this invention provides catalyst compositions comprising one or more half-sandwich metallocenes and an activator component. In one aspect, the half-sandwich metallocene of this invention comprises a metal selected from titanium, zirconium, or hafnium. In another aspect, the half-sandwich metallocene may be a stannoxy-substituted metallocene compound having the following general formula:

(X$^1$)(X$^2$)(X$^3$)(X$^4$)M$^1$; wherein

M$^1$ is selected from titanium, zirconium, or hafnium;

(X$^1$) is selected from cyclopentadienyl, indenyl, fluorenyl, substituted cyclopentadienyl, substituted indenyl, or substituted fluorenyl;

each substituent on the substituted cyclopentadienyl, substituted indenyl, or substituted fluorenyl (X$^1$) is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen;

(X$^2$) is selected from a stannoxy group with the following formula:

—OSnR$_3$;

wherein R is independently selected from alkyl, cycloalkyl, aryl, aralkyl, substituted alkyl, substituted aryl, or substituted aralkyl, any one of which having from 1 to about 20 carbon atoms; OR' wherein R' is selected from alkyl, aryl, aralkyl, substituted alkyl, substituted aryl, or substituted aralkyl, any one of which having from 1 to about 20 carbon atoms; F; Cl; Br; or I; and (X$^3$) and (X$^4$) are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide.

Substituents on the substituted cyclopentadienyls, substituted indenyls, and substituted fluorenyls of (X$^1$), the (X$^3$) ligand, and the (X$^4$) ligand are independently selected and include, but are not limited to, an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen; as long as these groups do not terminate the activity of the catalyst composition. Thus, the terms "substituted indenyls" and "substituted fluorenyls" are also used herein to include partially saturated indenyls and fluorenyls including, but not limited to, tetrahydroindenyls, terahydro-fluorenyls, and octahydrofluorenyls.

For the formula $(X^1)(X^2)(X^3)(X^4)M^1$, examples of chemical moieties or groups that may be selected as substituents on the substituted cyclopentadienyls, substituted indenyls, and substituted fluorenyls of $(X^1)$, include, but are not limited to, the following groups. Unless otherwise specified, R is independently selected from: an aliphatic group; an aromatic group; a cyclic group; any combination thereof; any substituted derivative thereof, including but not limited to, a halide-, an alkoxide-, or an amide-substituted derivative thereof; any one of which has from 1 to about 20 carbon atoms; or hydrogen.

Examples of aliphatic groups, in each instance, include, but are not limited to, an alkyl group, a cycloalkyl group, an alkenyl group, a cycloalkenyl group, an alkynyl group, an alkadienyl group, a cyclic group, and the like, and includes all substituted, unsubstituted, branched, and linear analogs or derivatives thereof, in each instance having from one to about 20 carbon atoms. Thus, aliphatic groups include, but are not limited to, hydrocarbyls such as paraffins and alkenyls. For example, aliphatic groups as used herein include methyl, ethyl, propyl, n-butyl, tert-butyl, sec-butyl, isobutyl, amyl, isoamyl, hexyl, cyclohexyl, heptyl, octyl, nonyl, decyl, dodecyl, 2-ethylhexyl, pentenyl, butenyl, and the like.

Examples of cyclic groups, in each instance, include, but are not limited to, cycloparaffins, cycloolefins, cycloacetylenes, arenes such as phenyl, bicyclic groups and the like, including substituted derivatives thereof, in each instance having from about 3 to about 20 carbon atoms. Thus heteroatom-substituted cyclic groups such as epoxyl are included herein.

Examples of halides, in each instance, include fluoride, chloride, bromide, and iodide.

In each instance, oxygen groups are oxygen-containing groups, examples of which include, but are not limited to, alkoxy or aryloxy groups (—OR), —OC(O)R, —OC(O)H, —OSiR$_3$, —OPR$_2$, —OAlR$_2$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms. Examples of alkoxy or aryloxy groups (—OR) groups include, but are not limited to, methoxy, ethoxy, propoxy, butoxy, phenoxy, substituted phenoxy, and the like.

In each instance, sulfur groups are sulfur-containing groups, examples of which include, but are not limited to, —SR, —OSO$_2$R, —OSO$_2$OR, —SCN, —SO$_2$R, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, nitrogen groups are nitrogen-containing groups, which include, but are not limited to, —NH$_2$, —NHR, —NR$_2$, —NO$_2$, —N$_3$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, phosphorus groups are phosphorus-containing groups, which include, but are not limited to, —PH$_2$, —PHR, —PR$_2$, —P(O)R$_2$, —P(OR)$_2$, —P(O)(OR)$_2$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, arsenic groups are arsenic-containing groups, which include, but are not limited to, —AsHR, —AsR$_2$, —As(O)R$_2$, —As(OR)$_2$, —As(O)(OR)$_2$, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, carbon groups are carbon-containing groups, which include, but are not limited to, alkyl halide groups that comprise halide-substituted alkyl groups with 1 to about 20 carbon atoms, aralkyl groups with l to about 20 carbon atoms, —C(O)H, —C(O)R, —C(O)OR, cyano, —C(NR)H, —C(NR)R, C(NR)OR, and the like, including substituted derivatives thereof, wherein R in each instance is selected from alkyl, cycloalkyl, aryl, aralkyl, substituted alkyl, substituted aryl, or substituted aralkyl having from 1 to about 20 carbon atoms.

In each instance, silicon groups are silicon-containing groups, which include, but are not limited to, silyl groups such alkylsilyl groups, arylsilyl groups, arylalkylsilyl groups, siloxy groups, and the like, which in each instance have from 1 to about 20 carbon atoms. For example, silicon groups include trimethylsilyl and phenyloctylsilyl groups.

In each instance, germanium groups are germanium-containing groups, which include, but are not limited to, germyl groups such alkylgermyl groups, arylgermyl groups, arylalkylgermyl groups, germyloxy groups, and the like, which in each instance have from 1 to about 20 carbon atoms.

In each instance, tin groups are tin-containing groups, which include, but are not limited to, stannyl groups such alkylstannyl groups, arylstannyl groups, arylalkylstannyl groups, stannoxy (or "stannyloxy") groups, and the like, which in each instance have from 1 to about 20 carbon atoms. Thus, tin groups include, but are not limited to, stannoxy groups.

In each instance, lead groups are lead-containing groups, which include, but are not limited to, alkyllead groups, aryllead groups, arylalkyllead groups, and the like, which in each instance, have from 1 to about 20 carbon atoms.

In each instance, boron groups are boron-containing groups, which include, but are not limited to, —BR$_2$, —BX$_2$, —BRX, wherein X is a monoanionic group such as halide, hydride, alkoxide, alkyl thiolate, and the like, and wherein R in each instance is selected from alkyl, cycloalkyl, aryl, aralkyl, substituted alkyl, substituted aryl, or substituted aralkyl having from 1 to about 20 carbon atoms.

In each instance, aluminum groups are aluminum-containing groups, which include, but are not limited to, —AlR$_2$, —AlX$_2$, —AlRX, wherein X is a monoanionic group such as halide, hydride, alkoxide, alkyl thiolate, and the like, and wherein R in each instance is selected from alkyl, cycloalkyl, aryl, aralkyl, substituted alkyl, substituted aryl, or substituted aralkyl having from 1 to about 20 carbon atoms.

Examples of inorganic groups that may be used as substituents for substituted cyclopentadienyls, substituted indenyls, substituted fluorenyls, and substituted boratabenzenes, in each instance, include, but are not limited to, —SO$_2$X, —OAlX$_2$, —OSiX$_3$, —OPX$_2$, —SX, —OSO$_2$X, —AsX$_2$, —As(O)X$_2$, —PX$_2$, and the like, wherein X is a monoanionic group such as halide, hydride, amide, alkoxide, alkyl thiolate, and the like, and wherein any alkyl, cycloalkyl, aryl, aralkyl, substituted alkyl, substituted aryl, or substituted aralkyl group or substituent on these ligands has from 1 to about 20 carbon atoms.

Examples of organometallic groups that may be used as substituents for substituted cyclopentadienyls, substituted indenyls, and substituted fluorenyls, in each instance, include, but are not limited to, organoboron groups, organoaluminum groups, organogallium groups, organosilicon groups, organogermanium groups, organotin groups, organolead groups, organo-transition metal groups, and the like, having from 1 to about 20 carbon atoms.

In one aspect of this invention, $(X^3)$ and $(X^4)$ are independently selected, and include, but are not limited to, the following groups and their substituted derivatives: halides, alkoxides having from 1 to about 10 carbon atoms, or hydrocarbyls having from 1 to about 10 carbon atoms. In another aspect of this invention, $(X^3)$ and $(X^4)$ are selected from chloro, bromo, methyl, benzyl, or trifluoromethylsulfonyl. In yet another aspect, $(X^3)$ and $(X^4)$ are chloro.

In still another aspect of this invention, the half-sandwich metallocene compound used in this invention has the following general formula:

($\eta^5$-cycloalkadienyl)M(OSnR$_3$)X$_2$; wherein cycloalkadienyl is selected from cyclopentadienyl, indenyl, fluorenyl, or substituted analogs thereof;

M is selected from Ti, Zr, or Hf;

R is independently selected from substituted or non-substituted alkyl, cycloalkyl, aryl, aralkyl, alkoxide, or aryloxide, any one of which having from 1 to about 20 carbon atoms; F; Cl; Br; or I; and X is independently selected from F; Cl; Br; I; or a substituted or non-substituted alkyl, cycloalkyl, aryl, aralkyl, alkoxide, or aryloxide, any one of which having from 1 to about 20 carbon atoms.

Numerous processes to prepare metallocenes that can be employed in this invention have been reported. For example, U.S. Pat. Nos. 4,939,217, 5,210,352, 5,436,305, 5,401,817, 5,631,335, 5,571,880, 5,191,132, 5,480,848, 5,399,636, 5,565,592, 5,347,026, 5,594,078, 5,498,581, 5,496,781, 5,563,284, 5,554,795, 5,420,320, 5,451,649, 5,541,272, 5,705,478, 5,631,203, 5,654,454, 5,705,579, and 5,668,230 describe such methods, each of which is incorporated herein by reference, in its entirety. The following treatises also describe such methods: Wailes, P. C.; Coutts, R. S. P.; Weigold, H. in Organometallic Chemistry of Titanium, Zironium, and Hafnium, Academic; New York, 1974.; Cardin, D. J.; Lappert, M. F.; and Raston, C. L.; Chemistry of Organo-Zirconium and -Hafnium Compounds; Halstead Press; New York, 1986.

As used herein, half-sandwich metallocene compound includes monokis(cyclopentadienyl) compounds, monokis(indenyl) compounds, monokis(fluorenyl) compounds, and their substituted analogs. Examples of such half-sandwich, stannoxy-substituted metallocene compounds that are useful in the present invention include, but are not limited to, the following compounds:

($\eta^5$-cyclopentadienyl)titanium(triphenylstannoxy)dichloride,

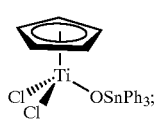

($\eta^5$-cyclopentadienyl)zirconium(triphenylstannoxy)dichloride,

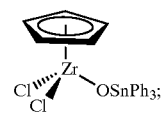

($\eta^5$-cyclopentadienyl)titanium(trimethylstannoxy)dichloride,

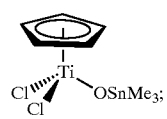

($\eta^5$-cyclopentadienyl)zirconium(triethylstannoxy)dichloride,

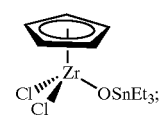

($\eta^5$-cyclopentadienyl)hafnium(triphenylstannoxy)dichloride,

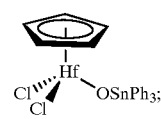

($\eta^5$-cyclopentadienyl)titanium(tri-n-butylstannoxy)dichloride,

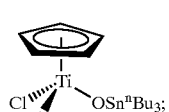

($\eta^5$-cyclopentadienyl)titanium(triphenylstannoxy)dibromide,

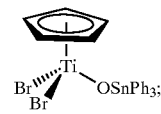

($\eta^5$-pentamethylcyclopentadienyl)titanium(triphenylstannoxy)dibromide,

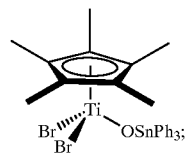

($\eta^5$-cyclopentadienyl)titanium(tributylstannoxy)dibromide,

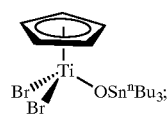

and the like.

In one aspect of this invention, the half-sandwich metallocene compound is selected from ($\eta^5$-cyclopentadienyl)titanium(triphenylstannoxy)dichloride or ($\eta^5$-cyclopentadienyl)zirconium(triphenylstannoxy)dichloride.

Catalyst Composition—The Activator

In addition to the half-sandwich metallocenes disclosed herein, the catalyst composition of this invention further comprises an activator. In one aspect of this invention, the activator is selected from an aluminoxane, an organoboron compound, an ionizing ionic compound, a clay material, a chemically-treated solid oxide combined with an organoaluminum compound, or any combination thereof. In another aspect of the invention, the clay material is selected from clays and other natural and synthetic layered oxides, cogelled clay matrices containing silica or other oxides, pillared clays, zeolites, clay minerals, other layered minerals, or combinations thereof, including, but not limited to, ion-exchangeable layered minerals (natural or synthetic) or composites made from such compounds, regardless of whether the layered structure remains intact or not. The activator may further comprise a combination or mixture of any of these activators.

The Chemically-Treated Solid Oxide

In one aspect, the present invention encompasses catalyst compositions comprising a chemically-treated solid oxide which serves as an acidic activator-support, and which is typically used in combination with an organoaluminum compound. In one aspect, the chemically-treated solid oxide comprises a solid oxide treated with an electron-withdrawing anion; wherein the solid oxide is selected from silica, alumina, silica-alumina, aluminum phosphate, heteropolytungstates, titania, zirconia, magnesia, boria, zinc oxide, mixed oxides thereof, or mixtures thereof; and wherein the electron-withdrawing anion is selected from fluoride, chloride, bromide, phosphate, triflate, bisulfate, sulfate, or any combination thereof.

The chemically-treated solid oxide includes the contact product of at least one solid oxide compound and at least one electron-withdrawing anion source. In one aspect, the solid oxide compound comprises an inorganic oxide. It is not required that the solid oxide compound be calcined prior to contacting the electron-withdrawing anion source. The contact product may be calcined either during or after the solid oxide compound is contacted with the electron-withdrawing anion source. In this aspect, the solid oxide compound may be calcined or uncalcined. In another aspect, the chemically-treated solid oxide may comprise the contact product of at least one calcined solid oxide compound and at least one electron-withdrawing anion source.

The chemically-treated solid oxide exhibits enhanced acidity as compared to the corresponding untreated solid oxide compound. The chemically-treated solid oxide also functions as a catalyst activator as compared to the corresponding untreated solid oxide. While not intending to be bound by theory, it is believed that the chemically-treated solid oxide may function as an ionizing solid oxide compound by completely or partially extracting an anionic ligand from the metallocene. However, the chemically-treated solid oxide is an activator regardless of whether it is ionizes the metallocene, abstracts an anionic ligand to form an ion pair, weakens the metal-ligand bond in the metallocene, simply coordinates to an anionic ligand when it contacts the chemically-treated solid oxide, or any other mechanisms by which activation may occur. While the chemically-treated solid oxide activates the metallocene in the absence of cocatalysts, it is not necessary to eliminate cocatalysts from the catalyst composition. The activation function of the chemically-treated solid oxide is evident in the enhanced activity of catalyst composition as a whole, as compared to a catalyst composition containing the corresponding untreated solid oxide. However, it is believed that the chemically-treated solid oxide functions as an activator, even in the absence of organoaluminum compound, aluminoxanes, organoboron compounds, or ionizing ionic compounds.

In one aspect, the chemically-treated solid oxide of this invention comprises a solid inorganic oxide material, a mixed oxide material, or a combination of inorganic oxide materials, that is chemically-treated with an electron-withdrawing component, and optionally treated with a metal. Thus, the solid oxide of this invention encompasses oxide materials such as alumina, "mixed oxide" compounds thereof such as silica-alumina, and combinations and mixtures thereof. The mixed oxide compounds such as silica-alumina single chemical phases with more than one metal combined with oxygen to form a solid oxide compound, and are encompassed by this invention.

In one aspect of this invention, the chemically-treated solid oxide further comprises a metal or metal ion selected from zinc, nickel, vanadium, silver, copper, gallium, tin, tungsten, molybdenum, or any combination thereof. Examples of chemically-treated solid oxides that further comprise a metal or metal ion include, but are not limited to, zinc-impregnated chlorided alumina, zinc-impregnated fluorided alumina, zinc-impregnated chlorided silica-alumina, zinc-impregnated fluorided silica-alumina, zinc-impregnated sulfated alumina, or any combination thereof.

In another aspect, the chemically-treated solid oxide of this invention comprises a solid oxide of relatively high porosity, which exhibits Lewis acidic or Brønsted acidic behavior. The solid oxide is chemically-treated with an electron-withdrawing component, typically an electron-withdrawing anion, to form a chemically-treated solid oxide. While not intending to be bound by the following statement, it is believed that treatment of the inorganic oxide with an electron-withdrawing component augments or enhances the acidity of the oxide. Thus, the chemically-treated solid oxide exhibits Lewis or Brønsted acidity which is typically greater than the Lewis or Brønsted acidity of the untreated solid oxide. One method to quantify the acidity of the chemically-treated and untreated solid oxide materials is by comparing the polymerization activities of the treated and untreated oxides under acid catalyzed reactions.

In one aspect, the chemically-treated solid oxide comprises a solid inorganic oxide comprising oxygen and at least one element selected from Group 2, 3, 4, 5, 6, 7, 8, 9, 10, 11, 12, 13, 14, or 15 of the periodic table, or comprising oxygen and at least one element selected from the lanthanide or actinide elements. (See: *Hawley's Condensed Chemical Dictionary*, 11$^{th}$ Ed., John Wiley & Sons; 1995; Cotton, F. A.; Wilkinson, G.; Murillo; C. A.; and Bochmann; M. *Advanced Inorganic Chemistry*, 6$^{th}$ Ed., Wiley-Interscience, 1999.) Usually, the inorganic oxide comprises oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn or Zr.

Suitable examples of solid oxide materials or compounds that can be used in the chemically-treated solid oxide of the present invention include, but are not limited to, $Al_2O_3$, $B_2O_3$, BeO, $Bi_2O_3$, CdO, $CO_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. Examples of mixed oxides that can be used in the chemically-treated solid oxide of the present invention include, but are not limited to, silica-alumina, silica-titania, silica-zirconia, zeolites, clays, alumina-titania, alumina-zirconia, aluminum phosphate, heteropolytungstates, and the like.

In one aspect of this invention, the solid oxide material is chemically-treated by contacting it with at least one electron-withdrawing component, typically an electron-withdrawing anion source. Further, the solid oxide material is optionally chemically-treated with a metal ion, then calcining to form a metal-containing or metal-impregnated chemically-treated solid oxide. Alternatively, a solid oxide material and an electron-withdrawing anion source are contacted and calcined simultaneously. The method by which the oxide is contacted with an electron-withdrawing component, typically a salt or an acid of an electron-withdrawing anion, includes, but is not limited to, gelling, co-gelling, impregnation of one compound onto another, and the like. Typically, following any contacting method, the contacted mixture of oxide compound, electron-withdrawing anion, and optionally the metal ion is calcined.

The electron-withdrawing component used to treat the oxide is any component that increases the Lewis or Brønsted acidity of the solid oxide upon treatment. In one aspect, the electron-withdrawing component is an electron-withdrawing anion derived from a salt, an acid, or other compound such as a volatile organic compound that may serve as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, trifluoroacetate, triflate, and the like, including mixtures and combinations thereof. In addition, other ionic or non-ionic compounds that serve as sources for these electron-withdrawing anions may also be employed in the present invention.

When the electron-withdrawing component comprises a salt of an electron-withdrawing anion, the counterion or cation of that salt may be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron-withdrawing anions, in varying proportions, can be used to tailor the specific acidity of the activator-support to the desired level. Combinations of electron-withdrawing components may be contacted with the oxide material simultaneously or individually, and any order that affords the desired activator-support acidity.

Once the solid oxide has been treated and dried, it is subsequently calcined. Calcining of the treated solid oxide is generally conducted in an ambient atmosphere, typically in a dry ambient atmosphere, at a temperature from about 200° C. to about 900° C., and for a time of about 1 minute to about 100 hours. In another aspect, calcining is conducted at a temperature from about 300° C. to about 800° C. and in another aspect, calcining is conducted at a temperature from about 400° C. to about 700° C. In yet another aspect, calcining is conducted from about 1 hour to about 50 hours, and in another aspect calcining is conducted, from about 3 hours to about 20 hours. In still another aspect, when the treated solid oxide is fluorided silica-alumina, calcining may be carried out from about 1 to about 10 hours at a temperature from about 350° C. to about 550° C.

Further, any type of suitable ambient can be used during calcining. Generally, calcining is conducted in an oxidizing atmosphere, such as air. Alternatively, an inert atmosphere, such as nitrogen or argon, or a reducing atmosphere such as hydrogen or carbon monoxide, may be used.

In another aspect of the invention, the solid oxide component used to prepare the chemically-treated solid oxide has a pore volume greater than about 0.1 cc/g. In another aspect, the solid oxide component has a pore volume greater than about 0.5 cc/g, and in yet another aspect, greater than about 1.0 cc/g. In still another aspect, the solid oxide component has a surface area from about 100 to about 1000 $m^2/g$. In another aspect, solid oxide component has a surface area from about 200 to about 800 $m^2/g$, and in still another aspect, from about 250 to about 600 $m^2/g$.

The solid oxide material may be treated with a source of halide ion or sulfate ion, or a combination of anions, and optionally treated with a metal ion, then calcined to provide the activator-support in the form of a particulate solid. Thus, the treated solid oxide component is generally selected from a halided or sulfated solid oxide component, a halided or a sulfated metal-containing solid oxide component, or a combination thereof. In one aspect of this invention, the treated solid oxide activator-support is selected from treated alumina, treated silica-alumina, or mixtures thereof. In another aspect, the treated alumina is selected from chlorided alumina, bromided alumina, sulfated alumina, fluorided silica-alumina, chlorided alumina or silica-alumina or silica-zirconia, bromided silica-alumina, or mixtures thereof, each optionally having been treated with a metal ion. In yet another aspect, the treated metal oxide is selected from chlorided alumina, sulfated alumina, fluorided silica-alumina, or mixtures thereof, each optionally having been treated with a metal ion.

In one aspect of this invention, the treated oxide activator-support comprises a fluorided solid oxide in the form of a particulate solid, thus a source of fluoride ion is added to the oxide by treatment with a fluoriding agent. In still another aspect, fluoride ion may be added to the oxide by forming a slurry of the oxide in a suitable solvent such as alcohol or water, including, but are not limited to, the one to three carbon alcohols because of their volatility and low surface tension. Examples of fluoriding agents that can be used in this invention include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), analogs thereof, and combinations thereof. For example, ammonium bifluoride $NH_4HF_2$ may be used as the fluoriding agent, due to its ease of use and ready availability.

In another aspect of the present invention, the solid oxide can be treated with a fluoriding agent during the calcining step. Any fluoriding agent capable of thoroughly contacting the solid oxide during the calcining step can be used. For example, in addition to those fluoriding agents described previously, volatile organic fluoriding agents may be used. Examples of volatile organic fluoriding agents useful in this aspect of the invention include, but are not limited to, freons, perfluorohexane, perfluorobenzene, fluoromethane, trifluoroethanol, and combinations thereof. Gaseous hydrogen fluoride or fluorine itself can also be used with the solid oxide is fluorided during calcining. One convenient method of contacting the solid oxide with the fluoriding agent is to vaporize a fluoriding agent into a gas stream used to fluidize the solid oxide during calcination.

Similarly, in another aspect of this invention, the chemically-treated solid oxide comprises a chlorided solid oxide in the form of a particulate solid, thus a source of chloride ion is added to the oxide by treatment with a chloriding agent. The chloride ion may be added to the oxide by forming a slurry of the oxide in a suitable solvent. In another aspect of the present invention, the solid oxide can be treated with a chloriding agent during the calcining step. Any chloriding agent capable of serving as a source of chloride and thoroughly contacting the oxide during the calcining step can be used. For example, volatile organic choriding agents may be used. Examples of volatile organic choriding agents useful in this aspect of the invention include, but are not limited to, certain freons, perchlorobenzene, chloromethane, dichloromethane, chloroform, carbon tetrachloride, and combinations thereof. Gaseous hydrogen chloride or chlorine itself can also be used with the solid oxide during calcining. One convenient method of contacting the oxide with the chloriding agent is to vaporize a chloriding agent into a gas stream used to fluidize the solid oxide during calcination.

In one aspect, the amount of fluoride or chloride ion present before calcining the solid oxide is generally from about 2 to about 50% by weight, where the weight percents are based on the weight of the solid oxide, for example silica-alumina, before calcining. In another aspect, the the amount of fluoride or chloride ion present before calcining the solid oxide is from about 3 to about 25% by weight, and in another aspect, from about 4 to about 20% by weight. If the fluoride or chloride ion are added during calcining, such as when calcined in the presence of $CCl_4$, there is typically no fluoride or chloride ion in the solid oxide before calcining. Once impregnated with halide, the halided oxide may be dried by any method known in the art including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina can have a pore volume greater than about 0.5 cc/g.

In one aspect, the pore volume may be greater than about 0.8 cc/g, and in another aspect, the pore volume may be greater than about 1.0 cc/g. Further, the silica-alumina may have a surface area greater than about 100 $m^2/g$. In one aspect, the surface area is greater than about −250 $m^2/g$, and in another aspect, the surface area may be greater than about 350 $m^2/g$. Generally, the silica-alumina of this invention has an alumina content from about 5 to about 95%. In one aspect, the alumina content may be from about 5 to about 50%, and in another aspect, the alumina content may be from about 8% to about 30% alumina by weight.

The sulfated solid oxide comprises sulfate and a solid oxide component such as alumina or silica-alumina, in the form of a particulate solid. Optionally, the sulfated oxide is further treated with a metal ion such that the calcined sulfated oxide comprises a metal. In one aspect, the sulfated solid oxide comprises sulfate and alumina. In one aspect of this invention, the sulfated alumina is formed by a process wherein the alumina is treated with a sulfate source, for example selected from, but not limited to, sulfuric acid or ammonium sulfate.

In addition to being treated with an electron-withdrawing component such as halide or sulfate ion, the solid inorganic oxide of this invention may optionally be treated with a metal source, including metal salts or metal-containing compounds. In one aspect of the invention, these compounds may be added to or impregnated onto the solid oxide in solution form, and subsequently converted into the supported metal upon calcining. Accordingly, the solid inorganic oxide can further comprise a metal selected from zinc, nickel, vanadium, silver, copper, gallium, tin, tungsten, molybdenum, or a combination thereof. For example, zinc may be used to impregnate the solid oxide because it provides good catalyst activity and low cost. The solid oxide may be treated with metal salts or metal-containing compounds before, after, or at the same time that the solid oxide is treated with the electron-withdrawing anion.

Further, any method of impregnating the solid oxide material with a metal may be used. The method by which the oxide is contacted with a metal source, typically a salt or metal-containing compound, includes, but is not limited to, gelling, co-gelling, impregnation of one compound onto another, and the like. Following any contacting method, the contacted mixture of oxide compound, electron-withdrawing anion, and the metal ion is typically calcined. Alternatively, a solid oxide material, an electron-withdrawing anion source, and the metal salt or metal-containing compound are contacted and calcined simultaneously.

One aspect of this invention encompasses a process to produce a catalyst composition comprises contacting ($\eta^5$-cyclopentadienyl)titanium(triphenylstannoxy)dichloride, a chlorided zinc-impregnated alumina, and an organoaluminum compound selected from triisobutyl aluminum or triethylaluminum to produce the first catalyst composition. In one aspect, the amount of zinc used may be from about 0.5 millimoles to about 5 millimoles of zinc per gram of alumina. In another aspect, the chloriding treatment of the alumina comprises exposing the alumina to a volatile chlorine-containing compound at a temperature from about 500° C. to about 700° C.

The preparation of the treated solid oxide activators is described in U.S. Pat. Nos. 6,107,230, 6,300,271, 6,316,553, 6,355,594, 6,376,415, 6,391,816, and 6,395,666, each of which is incorporated herein by reference, in its entirety.

The Organoaluminum Compound

In one aspect, when the activator of the present invention comprises a treated inorganic oxide it may be used in combination with an organoaluminum compound. Thus, the present invention comprises a method to prepare a catalyst comprising contacting the organometal compound and a treated inorganic oxide with at least one organoaluminum compound. One aspect of this invention involves the use of some organoaluminum compound is to precontact the other catalyst components prior to introducing the catalyst into the polymerization reactor, and the balance of the organoaluminum compound to be introduced directly into the polymerization reactor. It is not required that the same organoaluminum compound used in the optional precontact step with the other catalyst components is the same as the organoaluminum compound introduced directly into the polymerization reactor.

Organoaluminum compounds that can be used along with the treated solid oxide to form the activator for a half-sandwich metallocene include, but are not limited to compounds having the following general formula:

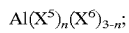

wherein $(X^5)$ is a hydrocarbyl having from 1 to about 20 carbon atoms; $(X^6)$ is selected from alkoxide or aryloxide, any one of which having from 1 to about 20 carbon atoms, halide, or hydride; and n is a number from 1 to 3, inclusive.

In one aspect of this invention, $(X^5)$ is an alkyl having from 2 to about 10 carbon atoms. In another aspect, $(X^5)$ is selected from ethyl, propyl, n-butyl, sec-butyl, isobutyl, hexyl, and the like.

In another aspect, $(X^6)$ is selected from alkoxide or aryloxide, any one of which having from 1 to about 10 carbon atoms, halide, or hydride. In yet another aspect, $(X^6)$ is independently selected from fluoro or chloro.

In the formula $Al(X^5)_n(X^6)_{3-n}$, n is a number from 1 to 3 inclusive. In one aspect of this invention, n is 3. The value of n is not restricted to be an integer, therefore this formula includes sesquihalide compounds.

Generally, examples of organoaluminum compounds that can be used in this invention include, but are not limited to, trialkylaluminum compounds, dialkylaluminium halide compounds, alkylaluminum dihalide compounds, alkylaluminum sesquihalide compounds, and combinations thereof. Specific examples of organoaluminum compounds that can be used in this invention in the precontacted mixture with the organometal compound and an olefin or acetylene monomer include, but are not limited to, trimethylaluminum (TMA); triethylaluminum (TEA); tripropylaluminum; diethylaluminum ethoxide; tributylaluminum; disobutylaluminum hydride; triisobutylaluminum (TIBAL); and diethylaluminum chloride.

One aspect of this invention involves the optional use of some or all of the organoaluminum compound to precontact the other catalyst components prior to introducing the catalyst into the polymerization reactor. The balance of the organoaluminum compound may be introduced directly into the polymerization reactor. The amounts of organoaluminum compound disclosed herein include the total amount of organoaluminum compound used in an optional precontact step, and any additional organoaluminum compound added in a different step. In one aspect, triethylaluminum (TEA) and triisobutylaluminum (TIBAL) may be used in this aspect of this invention.

The Aluminoxane Activator

The present invention provides catalyst compositions comprising one or more half-sandwich metallocenes, and an activator component. In one aspect, the activator of this invention comprises at least one aluminoxane activator. Aluminoxanes are also referred to as poly(hydrocarbyl aluminum oxides). In this aspect, the half-sandwich metallocene may be contacted with the aluminoxane in a saturated hydrocarbon compound solvent, though any solvent which is substantially inert to the reactants, intermediates, and products of the activation step can be used. Thus, in one aspect, the catalyst compositions of the present invention comprise the composition that results from reaction of at least one aluminoxane cocatalyst with at least one half-sandwich metallocene. The catalyst composition formed in this manner may be collected by methods known to those of skill in the art, including but not limited to filtration, or the catalyst composition may be introduced into the polymerization reactor without being isolated.

The aluminoxane compound of this invention may be an oligomeric aluminum compound, wherein the aluminoxane compound can comprise linear structures, cyclic, or cage structures, or any mixture thereof. Cyclic aluminoxane compounds having the formula:

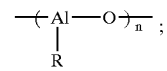

wherein

R is a linear or branched alkyl having from 1 to 10 carbon atoms, and n is an integer from 3 to about 10 are encompassed by this invention. The $(AlRO)_n$ moiety shown here also constitutes the repeating unit in a linear aluminoxane. Thus, linear aluminoxanes having the formula:

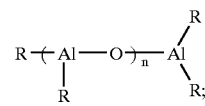

wherein

R is a linear or branched alkyl having from 1 to 10 carbon atoms, and n is an integer from 1 to about 50, are also encompassed by this invention.

Further, aluminoxanes may also have cage structures of the formula $R^t_{5m+\alpha}R^b_{m-\alpha}Al_{4m}O_{3m}$, wherein m is 3 or 4 and $\alpha$ is$=n_{Al(3)}-n_{O(2)}+n_{O(4)}$; wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ represents a terminal alkyl group, and $R^b$ represents a bridging alkyl group; wherein R is a linear or branched alkyl having from 1 to 10 carbon atoms.

In another aspect of this invention, the aluminoxanes that can be used as an activator in this invention may be any combination of the aluminoxane compounds and structures presented herein.

Thus, aluminoxanes that may be used as activators in this invention are generally represented generally by formulas such as $(R-Al-O)_n$, $R(R-Al-O)_nAlR_2$, and the like, wherein the R group is typically a linear or branched $C_1-C_6$ alkyl such as methyl, ethyl, propyl, butyl, pentyl, or hexyl wherein n typically represents an integer from 1 to about 50. In one embodiment, the aluminoxane compounds of this invention include, but are not limited to, methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, iso-pentylaluminoxane, neopentylaluminoxane, or combinations thereof.

While organoaluminoxanes with different types of R groups are encompassed by the present invention, methyl aluminoxane (MAO), ethyl aluminoxane, or isobutyl aluminoxane are typical activators used in the catalyst compositions of this invention. These aluminoxanes are prepared from trimethylaluminum, triethylaluminum, or triisobutylaluminum, respectively, and are sometimes referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as disclosed in U.S. Pat. No. 4,794,096, which is incorporated herein by reference, in its entirety.

The present invention contemplates many values of n in the aluminoxane formulas $(R—Al—O)_n$ and $R(R—Al—O)_nAlR_2$, and preferably n is at least about 3. However, depending upon how the organoaluminoxane is prepared, stored, and used, the value of n may be variable within a single sample of aluminoxane, and such a combination of organoaluminoxanes are comprised in the methods and compositions of the present invention.

Generally, any amount of the aluminoxane capable of activating the half-sandwich metallocene may be utilized in this invention. In preparing the catalyst composition of this invention, the molar ratio of the aluminum in the alumixoane to the half-sandwich metallocene in the composition is usually from about 1:1 to about 100,000:1. In one aspect, the molar ratio of the aluminum in the alumixoane to the half-sandwich metallocene in the composition is from about 5:1 to about 15,000:1. In another apsect, the molar ratio of the aluminum in the alumixoane to the half-sandwich metallocene in the composition is usually from about 5:1 to about 15,000:1. In yet another aspect, the amount of aluminoxane added to a polymerization zone is from about 0.01 mg/L to about 1000 mg/L, and in another aspect, from about 0.1 mg/L to about 100 mg/L. In still another aspect of this invention, the amount of aluminoxane used may be from about 1 mg/L to abut 50 mg/L.

Organoaluminoxanes can be prepared by various procedures which are well known in the art. Examples of organoaluminoxane preparations are disclosed in U.S. Pat. Nos. 3,242,099 and 4,808,561, each of which is incorporated herein by reference, in its entirety. One example of how an aluminoxane may be prepared is as follows. Water which is dissolved in an inert organic solvent may be reacted with an aluminum alkyl compound such as $AlR_3$ to form the desired organoaluminoxane compound. While not intending to be bound by this statement, it is believed that this synthetic method can afford a mixture of both linear and cyclic $(R—Al—O)_n$ aluminoxane species, both of which are encompassed by this invention. Alternatively, organoaluminoxanes may be prepared by reacting an aluminum alkyl compound such as $AlR_3$ with a hydrated salt, such as hydrated copper sulfate, in an inert organic solvent.

The aluminoxane activator may be supported or unsupported in the present invention. If supported, generally the support comprises an inorganic oxide, such as, silica, an aluminate compound, or combinations thereof. The use of a supported activator may result in a heterogeneous catalyst composition, and an unsupported activator can result in a homogeneous catalyst composition, and the present invention encompasses both heterogeneous and homogeneous catalysts.

The Organoboron Activators

In accordance with this invention, the catalyst composition comprises at least one half-sandwich metallocene compound and an activator. In one aspect of this invention, the activator comprises an organoboron compound. In one aspect, the organoboron compound comprises neutral boron compounds, borate salts, or combinations thereof. For example, the organoboron compounds of this invention can comprise a fluoroorgano boron compound, a fluoroorgano borate compound, or a combination thereof. Any fluoroorgano boron or fluoroorgano borate compound known in the art can be utilized. The term fluoroorgano boron compounds has its usual meaning to refer to neutral compounds of the form $BY_3$. The term fluoroorgano borate compound also has its usual meaning to refer to the monoanionic salts of a fluoroorgano boron compound of the form $[cation]^+[BY_4]^-$, where Y represents a fluorinated organic group. For convenience, fluoroorgano boron and fluoroorgano borate compounds are typically referred to collectively by organoboron compounds, or by either name as the context requires.

Examples of fluoroorgano borate compounds that can be used as cocatalysts in the present invention include, but are not limited to, fluorinated aryl borates such as, N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, and the like, including mixtures thereof. Examples of fluoroorgano boron compounds that can be used as cocatalysts in the present invention include, but are not limited to, tris(pentafluorophenyl)boron, tris[3,5-bis(trifluoromethyl)phenyl]boron, and the like, including mixtures thereof.

Although not intending to be bound by the following theory, these examples of fluoroorgano borate and fluoroorgano boron compounds, and related compounds, are thought to form "weakly-coordinating" anions when combined with organometal compounds, as disclosed in U.S. Pat. No. 5,919,983, which is incorporated herein by reference in its entirety.

Generally, any amount of organoboron compound can be utilized in this invention. In one aspect, the molar ratio of the organoboron compound to the metallocene compound in the composition is from about 0.1:1 to about 10:1. In another aspect, the amount of the fluoroorgano boron or fluoroorgano borate compound used as a cocatalyst or activator for the metallocene is in a range of from about 0.5 mole to about 10 moles of boron compound per mole of metallocene compound. In one aspect, the amount of fluoroorgano boron or fluoroorgano borate compound used as a cocatalyst or activator for the metallocene is in a range of from about 0.8 mole to about 5 moles of boron compound per mole of metallocene compound.

Like the aluminoxane activator, the fluoroorgano boron or fluoroorgano borate activators may be supported or unsupported in the present invention. If supported, generally the support comprises an inorganic oxide, such as, silica, an aluminate compound, or combinations thereof. The use of a supported activator may result in a heterogeneous catalyst composition, and an unsupported activator can result in a homogeneous catalyst composition, and the present invention encompasses both heterogeneous and homogeneous catalysts.

The Ionizing Ionic Compound

In accordance with this invention, the catalyst composition comprises at least one half-sandwich metallocene compound and an activator. In one aspect of this invention, the activator comprises at least one ionizing ionic compound. Examples of ionizing ionic compound are disclosed in U.S. Pat. Nos. 5,576,259 and 5,807,938, each of which is incorporated herein by reference, in its entirety.

An ionizing ionic compound is an ionic compound which can function to activate or enhance the activity of the catalyst composition. While not bound by theory, it is believed that the ionizing ionic compound may be capable of reacting with the metallocene compound and converting the metallocene into a cationic metallocene compound. Again, while not intending to be bound by theory, it is believed that the ionizing ionic compound may function as an ionizing compound by completely or partially extracting an anionic ligand, possibly a non-$\eta^5$-alkadienyl ligand such as $(X^3)$ or $(X^4)$, from the metallocene. However, the ionizing ionic compound is an activator regardless of whether it is ionizes the metallocene, abstracts an $(X^3)$ or $(X^4)$ ligand in a fashion as to form an ion pair, weakens the metal-$(X^3)$ or metal-$(X^4)$ bond in the metallocene, simply coordinates to any ligand ligand, or any other mechanisms by which activation may occur. Further, it is not necessary that the ionizing ionic compound activate the half-sandwich metallocene only. The activation function of the ionizing ionic compound is evident in the enhanced activity of catalyst composition as a whole, as compared to a catalyst composition containing catalyst composition that does not comprise any ionizing ionic compound.

Examples of ionizing ionic compounds include, but are not limited to, the following compounds: tri(n-butyl)ammonium tetrakis(p-tolyl)borate, tri(n-butyl)-ammonium tetrakis(m-tolyl)borate, tri(n-butyl)ammonium tetrakis(2,4-dimethylphenyl)-borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis(trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl) borate, triphenylcarbenium tetrakis(2,4-dimethylphenyl)borate, triphenylcarbenium tetrakis(3,5-dimethylphenyl) borate, triphenylcarbenium tetrakis[3,5-bis(trifluoromethyl)phenyl]borate, triphenylcarbenium tetrakis (pentafluorophenyl)borate, tropylium tetrakis(p-tolyl) borate, tropylium tetrakis(m-tolyl)borate, tropylium tetrakis (2,4-dimethylphenyl)borate, tropylium tetrakis(3,5-dimethylphenyl)borate, tropylium tetrakis[3,5-bis (trifluoromethyl)phenyl]borate, tropylium tetrakis (pentafluorophenyl)borate, lithium tetrakis (pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis (m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis(2, 4-dimethylphenyl)borate, potassium tetrakis(3,5-dimethylphenyl)borate, potassium tetrafluoroborate, tri(n-butyl) ammonium tetrakis(p-tolyl)aluminate, tri(n-butyl) ammonium tetrakis(m-tolyl)aluminate, tri(n-butyl) ammonium tetrakis(2,4-dimethylphenyl)aluminate, tri(n-butyl)ammonium tetrakis(3,5-dimethylphenyl)aluminate, tri (n-butyl)ammonium tetrakis(pentafluorophenyl)aluminate, N,N-dimethylanilinium tetrakis(p-tolyl)-aluminate aluminate, N,N-dimethylanilinium tetrakis(m-tolyl)aluminate, N,N-dimethylanilinium tetrakis(2,4-dimethylphenyl)aluminate, N,N-dimethylanilinium tetrakis(3,5-dimethylphenyl) aluminate, N,N-dimethylanilinium tetrakis (pentafluorophenyl)aluminate, triphenylcarbenium tetrakis(p-tolyl) aluminate, triphenylcarbenium tetrakis(m-tolyl)aluminate, triphenylcarbenium tetrakis(2,4-dimethylphenyl)aluminate, triphenylcarbenium tetrakis(3,5-dimethylphenyl)aluminate, triphenylcarbenium tetrakis(pentafluorophenyl)aluminate, tropylium tetrakis(p-tolyl)aluminate, tropylium tetrakis(m-tolyl)aluminate, tropylium tetrakis(2,4-dimethylphenyl)aluminate, tropylium tetrakis(3,5-dimethylphenyl)aluminate, tropylium tetrakis(pentafluorophenyl)aluminate, lithium tetrakis(pentafluorophenyl)aluminate, lithium tetraphenylaluminate, lithium tetrakis(p-tolyl)aluminate, lithium tetrakis (m-tolyl)aluminate, lithium tetrakis(2,4-dimethylphenyl) aluminate, lithium tetrakis(3,5-dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl) aluminate, potassium tetrakis(2,4-dimethylphenyl) aluminate, potassium tetrakis(3,5-dimethylphenyl) aluminate, potassium tetrafluoroaluminate, However, the ionizing ionic compound is not limited thereto in the present invention.

The Olefin Monomer

Unsaturated reactants that are useful in the polymerization processes with catalyst compositions and processes of this invention include olefin compounds having from about 2 to about 30 carbon atoms per molecule and having at least one olefinic double bond. This invention encompasses homopolymerization processes using a single olefin such as ethylene or propylene, as well as copolymerization reactions with at least one different olefinic compound. In one aspect of a copolymerization reaction of ethylene, copolymers of ethylene comprise a major amount of ethylene (>50 mole percent) and a minor amount of comonomer <50 mole percent), though this is not a requirement. The comonomers that can be copolymerized with ethylene should have from three to about 20 carbon atoms in their molecular chain.

Acyclic, cyclic, polycyclic, terminal ($\alpha$), internal, linear, branched, substituted, unsubstituted, functionalized, and non-functionalized olefins may be employed in this invention. For example, typical unsaturated compounds that may be polymerized with the catalysts of this invention include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, the five normal decenes, and mixtures of any two or more thereof. Cyclic and bicyclic olefins, including but not limited to, cyclopentene, cyclohexene, norbornylene, norbornadiene, and the like, may also be polymerized as described above.

In one aspect, when a copolymer is desired, the monomer ethylene may be copolymerized with a comonomer. In another aspect, examples of the comonomer include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, or the five normal decenes. In another aspect, the comonomer may be selected from 1-butene, 1-pentene, 1-hexene, 1-octene, 1-decene, or styrene.

In one aspect, the amount of comonomer introduced into a reactor zone to produce the copolymer is generally from about 0.01 to about 10 weight percent comonomer based on the total weight of the monomer and comonomer. In another aspect, the amount of comonomer introduced into a reactor zone is from about 0.01 to about 5 weight percent comonomer, and in still another aspect, from about 0.1 to about 4 weight percent comonomer based on the total weight of the monomer and comonomer. Alternatively, an amount sufficient to give the above described concentrations by weight, in the copolymer produced can be used.

While not intending to be bound by this theory, in the event that branched, substituted, or functionalized olefins are used as reactants, it is believed that steric hindrance may impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. In one aspect, at least one reactant for the catalyst compositions of this invention is ethylene, so the polymerizations are either homopolymerizations or copolymerizations with a different acyclic, cyclic, terminal, internal, linear, branched, substituted, or unsubstituted olefin. In addition, the catalyst compositions of this invention may be used in polymerization of diolefin compounds, including but are not limited to, 1,3-butadiene, isoprene, 1,4-pentadiene, and 1,5-hexadiene.

Preparation of the Catalyst Composition

In accordance with this invention, the catalyst compositions were prepared by a process comprising contacting various combinations of a half-sandwich metallocene with an activator for an effective period of time, prior to using this catalyst composition in the polymerization process. The contact process of preparing the catalyst of this invention may be carried out in an inert atmosphere and under substantially anhydrous conditions. In one aspect, the atmosphere is substantially oxygen-free and substantially free of water as the reaction begins, to prevent deactivation of the catalyst. This contacting procedure can occur in a variety of ways including, but not limited to, blending or mixing. Further, each of the catalyst composition components can be fed into the reactor separately, or various combinations of these compounds can be contacted together prior to being further contacted with additional catalyst components, or all three compounds can be contacted together before being introduced into the reactor.

In one aspect of this invention, the catalyst composition is prepared by contacting the metallocene compound and the chemically-treated solid oxide component to form a first mixture, and then contacting this first mixture with an organoaluminum compound to form a second mixture comprising the catalyst composition. In the first mixture, the metallocene compound and the chemically-treated solid oxide component may be contacted from about 1 minute to about 24 hours at a temperature from about 10° C. to about 100° C. In another aspect, the metallocene compound and the chemically-treated solid oxide component may be contacted from about 1 minute to about 1 hour at a temperature from about 15° C. to about 50° C.

In another aspect of this invention, the catalyst composition is prepared by contacting the metallocene compound, the organoaluminum compound, and the chemically-treated solid oxide component before injection into a polymerization reactor. In this aspect, the metallocene, organoaluminum compound, and the chemically-treated solid oxide are contacted for a period from about 1 minute to about 24 hours. In one aspect, this contact step occurs from about 1 minute to about 1 hour, and at a temperature from about 10° C. to about 200° C. In another aspect, this contact step occurs at a temperature from about 20° C. to about 80° C.

One another aspect of this invention is contacting a half-sandwich metallocene such as $(\eta^5\text{-}C_5H_5)Ti[OSn(C_6H_5)_3]Cl_2$ with an organoaluminum compound such as $Al(isobutyl)_3$ for about 30 minutes to form a first mixture, prior to contacting this first mixture with an chemically-treated solid oxide activator-support such as chlorided silica-alumina to form a second mixture. Once the second mixture of all the catalyst components is formed, it is optionally allowed to remain in contact from about 1 minute to about 24 hours prior to using this second mixture in a polymerization process.

Another aspect of this invention is contacting a half-sandwich metallocene such as $(\eta^5\text{-}C_5H_5)Ti[OSn(C_6H_5)_3]Cl_2$ with an organoaluminum compound such as $Al(isobutyl)_3$ and with an α-olefin monomer such as 1-hexene for about 30 minutes to form a first mixture, prior to contacting this first mixture with an acidic activator-support such as chlorided zinc-alumina to form a second mixture. Once the second mixture of all the catalyst components is formed, it is optionally allowed to remain in contact from about 1 minute to about 24 hours prior to using this second mixture in a polymerization process.

In one aspect, the weight ratio of the organoaluminum compound to the treated solid oxide component in the catalyst composition may be from about 5:1 to about 1:1000. In another aspect, the weight ratio of the organoaluminum compound to the treated solid oxide component in the catalyst composition may be from about 3:1 to about 1:100, and in another aspect, from about 1:1 to about 1:50. These weight ratios are based on the combined weights of organoaluminum, treated oxide, and metallocene used to prepare the catalyst composition, regardless of the order of contacting the catalyst components.

In another aspect, the weight ratio of the treated solid oxide component to the metallocene compound in the catalyst composition may be from about 10,000:1 to about 1:1. In another aspect, the weight ratio of the treated solid oxide component to the metallocene compound in the catalyst composition may be from about 1000:1 to about 10:1, and in yet another aspect, from about 250:1 to about 20:1. These weight ratios are based on the combined weights of organoaluminum, treated oxide, and metallocene used to prepare the catalyst composition, regardless of the order of contacting the catalyst components.

Utility of the Catalyst Composition in Polymerization Processes

Polymerizations using the catalysts of this invention can be carried out in any manner known in the art. Such polymerization processes include, but are not limited to slurry polymerizations, gas phase polymerizations, solution polymerizations, and the like, including multi-reactor combinations thereof. Thus, any polymerization zone known in the art to produce ethylene-containing polymers can be utilized. For example, a stirred reactor can be utilized for a batch process, or the reaction can be carried out continuously in a loop reactor or in a continuous stirred reactor.

After catalyst activation, a catalyst composition is used to homopolymerize ethylene, or copolymerize ethylene with a comonomer. In one aspect, a typical polymerization method is a slurry polymerization process (also known as the particle form process), which is well known in the art and is disclosed, for example in U.S. Pat. No. 3,248,179, which is incorporated by reference herein, in its entirety. Other polymerization methods of the present invention for slurry processes are those employing a loop reactor of the type disclosed in U.S. Pat. No. 3,248,179, and those utilized in a plurality of stirred reactors either in series, parallel, or combinations thereof, wherein the reaction conditions are different in the different reactors, which is also incorporated by reference herein, in its entirety.

In one aspect, polymerization temperature for this invention may range from about 60° C. to about 280° C., and in another aspect, polymerization reaction temperature may range from about 70° C. to about 110° C.

The polymerization reaction typically occurs in an inert atmosphere, that is, in atmosphere substantial free of oxygen and under substantially anhydrous conditions, thus, in the absence of water as the reaction begins. Therefore a dry, inert atmosphere, for example, dry nitrogen or dry argon, is typically employed in the polymerization reactor.

The polymerization reaction pressure can be any pressure that does not adversely affect the polymerization reaction, and it typically conducted at a pressure higher than the pretreatment pressures. In one aspect, polymerization pressures may be from about atmospheric pressure to about 1000 psig. In another aspect, polymerization pressures may be from about 50 psig to about 800 psig. Further, hydrogen can be used in the polymerization process of this invention to control polymer molecular weight.

Polymerizations using the catalysts of this invention can be carried out in any manner known in the art. Such processes that can polymerize monomers into polymers include, but are not limited to slurry polymerizations, gas phase polymerizations, solution polymerizations, and multi-reactor combinations thereof. Thus, any polymerization zone known in the art to produce olefin-containing polymers can be utilized. For example, a stirred reactor can be utilized for a batch process, or the reaction can be carried out continuously in a loop reactor or in a continuous stirred reactor. Typically, the polymerizations disclosed herein are carried out using a slurry polymerization process in a loop reaction zone. Suitable diluents used in slurry polymerization are well known in the art and include hydrocarbons which are liquid under reaction conditions. The term "diluent" as used in this disclosure does not necessarily mean an inert material, as this term is meant to include compounds and compositions that may contribute to polymerization process. Examples of hydrocarbons that can be used as diluents include, but are not limited to, cyclohexane, isobutane, n-butane, propane, n-pentane, isopentane, neopentane, and n-hexane. Typically, isobutane is used as the diluent in a slurry polymerization. Examples of this technology are found in U.S. Pat. Nos. 4,424,341; 4,501,885; 4,613,484; 4,737,280; and 5,597,892; each of which is incorporated by reference herein, in its entirety.

For purposes of the invention, the term polymerization reactor includes any polymerization reactor or polymerization reactor system known in the art that is capable of polymerizing olefin monomers to produce homopolymers or copolymers of the present invention. Such reactors can comprise slurry reactors, gas-phase reactors, solution reactors, or any combination thereof. Gas phase reactors can comprise fluidized bed reactors or tubular reactors. Slurry reactors can comprise vertical loops or horizontal loops. Solution reactors can comprise stirred tank or autoclave reactors.

Polymerization reactors suitable for the present invention can comprise at least one raw material feed system, at least one feed system for catalyst or catalyst components, at least one reactor system, at least one polymer recovery system or any suitable combination thereof. Suitable reactors for the present invention can further comprise any one, or combination of, a catalyst storage system, an extrusion system, a cooling system, a diluent recycling system, or a control system. Such reactors can comprise continuous take-off and direct recycling of catalyst, diluent, and polymer. Generally, continuous processes can comprise the continuous introduction of a monomer, a catalyst, and a diluent into a polymerization reactor and the continuous removal from this reactor of a suspension comprising polymer particles and the diluent.

Polymerization reactor systems of the present invention can comprise one type of reactor per system or multiple reactor systems comprising two or more types of reactors operated in parallel or in series. Multiple reactor systems can comprise reactors connected together to perform polymerization, or reactors that are not connected. The polymer can be polymerized in one reactor under one set of conditions, and then the polymer can be transferred to a second reactor for polymerization under a different set of conditions.

In one aspect of the invention, the polymerization reactor system can comprise at least one loop slurry reactor. Such reactors are known in the art and can comprise vertical or horizontal loops. Such loops can comprise a single loop or a series of loops. Multiple loop reactors can comprise both vertical and horizontal loops. The slurry polymerization can be performed in an organic solvent that can disperse the catalyst and polymer. Examples of suitable solvents include butane, hexane, cyclohexane, octane, and isobutane. Monomer, solvent, catalyst and any comonomer are continuously fed to a loop reactor where polymerization occurs. Polymerization can occur at low temperatures and pressures. Reactor effluent can be flashed to remove the solid resin.

In yet another aspect of this invention, the polymerization reactor can comprise at least one gas phase reactor. Such systems can employ a continuous recycle stream containing one or more monomers continuously cycled through the fluidized bed in the presence of the catalyst under polymerization conditions. The recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone.

In still another aspect of the invention, the polymerization reactor can comprise a tubular reactor. Tubular reactors can make polymers by free radical initiation, or by employing the catalysts typically used for coordination polymerization. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams are intermixed for polymerization. Heat and pressure can be employed appropriately to obtain optimal polymerization reaction conditions.

In another aspect of the invention, the polymerization reactor can comprise a solution polymerization reactor. During solution polymerization, the monomer is contacted with the catalyst composition by suitable stirring or other means. A carrier comprising an inert organic diluent or excess monomer can be employed. If desired, the monomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed during polymerization to obtain better temperature control and to maintain uniform polymerization mixtures throughout the polymerization zone. Adequate means are utilized for dissipating the exothermic heat of polymerization. The polymerization can be effected in a batch manner, or in a continuous manner. The reactor can comprise a series of at least one separator that employs high pressure and low pressure to separate the desired polymer.

In a further aspect of the invention, the polymerization reactor system can comprise the combination of two or more reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactors. Alternatively, polymerization in multiple reactors can include the manual transfer of polymer from one reactor to subsequent reactors for continued polymerization. Such reactors can include any combination including, but not limited to, multiple loop reactors, multiple gas reactors, a combination of loop and gas reactors, a combination of autoclave reactors or solution reactors with gas or loop reactors, multiple solution reactors, or multiple autoclave reactors.

After the polymers are produced, they can be formed into various articles, including but not limited to, household containers, utensils, film products, drums, fuel tanks, pipes, geomembranes, and liners. Various processes can form these articles. Usually, additives and modifiers are added to the polymer in order to provide desired effects. By using the invention described herein, articles can likely be produced at a lower cost, while maintaining most or all of the unique properties of polymers produced with metallocene catalysts.

Definitions

In order to more clearly define the terms used herein, the following definitions are provided. To the extent that any definition or usage provided by any document incorporated herein by reference conflicts with the definition or usage provided herein, the definition or usage provided herein controls.

The term polymer is used herein to mean homopolymers comprising ethylene and/or copolymers of ethylene and another olefinic comonomer. Polymer is also used herein to mean homopolymers and copolymers of acetylenes.

The term inert atmosphere is used herein to refer to any type of ambient atmosphere that is substantially unreactive toward the particular reaction, process, or material around which the atmosphere surrounds or blankets. Thus, this term is typically used herein to refer to the use of a substantially oxygen-free and moisture-free blanketing gas, including but not limited to dry argon, dry nitrogen, dry helium, or mixtures thereof, when any precursor, component, intermediate, or product of a reaction or process is sensitive to particular gases or moisture. Additionally, inert atmosphere is also used herein to refer to the use of dry air as a blanketing atmosphere when the precursors, components, intermediates, or products of the reaction or process are only moisture-sensitive and not oxygen-sensitive. However, inert atmosphere, as used herein, would typically exclude $CO_2$ or CO because these gases may be reactive toward the particular reaction, process, or material around which they would surround or blanket, despite their occasional use as inert blanketing gases in other processes.

The term half-sandwich metallocene is used herein to refer to metallocene and metallocene-like compounds containing only one $\eta^5$-alkadienyl ligand, typically one $\eta^5$-cycloalkadienyl ligand, and in one aspect, one $\eta^5$-cyclopentadienyl ligand, or its analogs or derivatives. Thus, the metallocenes of this invention typically comprise a cyclopentadienyl, indenyl, fluorenyl, or boratabenzene ligand, or substituted derivatives thereof. Possible substituents on these ligands include hydrogen, therefore the description "substituted derivatives thereof" in this invention comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like.

The terms catalyst composition, catalyst mixture, and the like are used herein to refer to the mixture of catalyst components disclosed herein, regardless of the actual product of the reaction of the components, the nature of the active catalytic site, or the fate of any one component such as organometal compound and activator. Therefore, the terms catalyst composition, catalyst mixture, and the like include both heterogeneous compositions and homogenous compositions.

The term hydrocarbyl is used to specify a hydrocarbon radical group that includes, but is not limited to aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, heteroatom substituted derivatives thereof.

The terms activator, cocatalyst, and related terms are generic descriptors used to refer to the compounds, compositions, or mixtures that are contacted with the half-sandwich metallocenes to form the catalyst compositions of this invention, regardless of any particular reaction or mechanism by which such compounds, compositions, or mixtures function. Activators include, but are not limited to: compounds such as an aluminoxane, an organoboron compound, an ionizing ionic compound, a clay material, a chemically-treated solid oxide combined with an organoaluminum compound, or any combination thereof. In another aspect, the term activator is used to refer to compositions or mixtures, examples of which include, but are not limited to, mixtures of chemically-treated solid oxides and organoaluminum compounds, and mixtures of clays or other layered materials and organoaluminum compounds.

The term chemically-treated solid oxide is used interchangeably with terms such as solid acidic activator-support, acidic activator-support, or simply activator-support, and the like to indicate a chemically-treated, solid, inorganic oxide of relatively high porosity, which exhibits enhanced Lewis acidic or Brønsted acidic behavior, arising through treatment of the solid oxide with an electron-withdrawing component, typically an electron-withdrawing anion or an electron-withdrawing anion source compound. These terms are not used to imply this component is inert, and it should not be construed as an inert component of the catalyst composition. Rather, the chemically-treated solid oxides in combination with the organoaluminum compounds comprise activators of the half-sandwich metallocenes and comprise an insoluble component of the catalyst composition of this invention to produce polymers, and at which the active catalytic sites are situated, and are not intended to be limiting.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed above and throughout the text are provided solely for their disclosure prior to the filing date of the present application. Nothing herein is to be construed as an admission that the inventors are not entitled to antedate such disclosure by virtue of prior invention.

For any particular compound disclosed herein, any general structure presented also encompasses all conformational isomers, regioisomers, and stereoisomers that may arise from a particular set of substitutents. The general structure also encompasses all enantiomers, diastereomers, and other optical isomers whether in enantiomeric or racemic forms, as well as mixtures of stereoisomers, as the context requires.

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims.

In the following examples, unless otherwise specified, the syntheses and preparations described therein were carried out under an inert atmosphere such as nitrogen and/or argon. Solvents were purchased from commercial sources and were typically dried over activated alumina prior to use, or distilled from potassium metal prior to use. Unless otherwise specified, reagents were obtained from commercial sources.

EXAMPLE 1

Testing Methods

A "Quantachrome Autosorb-6 Nitrogen Pore Size Distribution Instrument," acquired from the Quantachrome Corporation, Syosset, N.Y., was used to determined surface areas and pore volumes of the treated oxide activator-supports of this invention. The melt Index (MI) of the polymer product was determined using a 2.16 kg load and High Load Melt Index (HLMI) was determined with a 21.6 kg load at 190° C.

EXAMPLE 2

Preparation of $(\eta^5\text{-}C_5H_5)Ti[OSn(C_6H_5)_3]Cl_2$

Triphenyltin hydroxide, 1.76 g (4.8 mmoles), was dissolved in 25 mL of dry THF. To this solutions was added dropwise a solution of 25 mL of THF and 3.0 mL (4.8 mmoles) of n-butyl lithium in hexanes. This reaction mixture was stirred for 2 hours. The resulting, slightly cloudy mixture was added dropwise to a solution of 1.05 g (4.8 mmoles) of $(\eta^5\text{-}C_5H_5)TiCl_3$ in 25 mL of THF over 1 hour. After stirring overnight, the slurry was filtered through Celite (diatomaceous earth), and the filtrate was then concentrated until a yellow solid began to form (20–25 mL). After cooling overnight in a freezer (at about −15° C.), the mixture was cooled in dry ice for 3 hours and then filtered. The resulting yellow powder was washed with heptane and dried to give 0.62 g of product.

EXAMPLE 3

General Sources and Properties of the Solid Oxide Materials Used to Prepare the Treated Solid Oxides Alumina was obtained as Ketjen™ grade B from Akzo Nobel, having a pore volume of about 1.78 cc/g and a surface area of about 340 m²/g or Ketjen™ L 95–98% alumina and 2–5% silica having a pore volume of 2.00 cc/g and surface area of 380 m²/g. Silica was obtained as Davison grade 952 from W.R. Grace, having a pore volume of about 1.6 cc/g and a surface area of about 300 m²/g. Silica-alumina was obtained as MS13-110 from W.R. Grace having 13% by weight alumina and 87% by weight silica and having a pore volume of about 1.2 cc/g and a surface area of about 350 m²/g.

EXAMPLE 4

Preparation of Zinc-Impregnated Chlorided Alumina

Ketjen™ grade B alumina, 544.85 g, was saturated to just past incipient wetness with an aqueous solution of 109 g of zinc chloride in 900 g of water and shaken to ensure uniform wetness. The solid was then dried in a vacuum oven at 120° C. and passed through a 80 mesh screen. A portion of the solid was then calcined in air for three hours at 600° C. using a 10 inch bed in a 45 mm diameter tube and 0.2 to 0.4 SCFH of nitrogen. After calcining, the furnace temperature was maintained at 600° C., and the gas stream was changed from air to dry nitrogen. Then, 15 mL of carbon tetrachloride were injected into the nitrogen stream and evaporated upstream from the alumina bed. The carbon tetrachloride vapor was carried up through the bed and reacted with the alumina in order to chloride the surface to produce a chlorided alumina. The chlorided alumina was white in color.

EXAMPLE 5

Preparation of Zinc-Impregnated Fluorided Silica-Alumina

Silica-alumina, sold as MS13-110 by W.R. Grace Company, 114.68 g, having a surface area of 400 m²/g and a pore volume of 1.2 cc/g, was impregnated to just beyond incipient wetness with a solution containing 17.6 g of Zn $(NO_3)_2 \cdot 6H_2O$ and 11.5 g of ammonium bifluoride dissolved in 125 mL of water. This mixture was then placed in a vacuum oven and dried overnight at 120° C. under half an atmosphere of vacuum. The final step in producing this activated-support was to calcine 10 grams of the material in dry fluidizing air at 500° C. for three hours, after which the zinc-impregnated, treated solid oxide was stored under nitrogen until used.

EXAMPLE 6

Preparation of Fluorided Silica-Alumina

Silica-alumina, MS13-110 from W.R. Grace Company, 700 g, was impregnated to just beyond incipient wetness with a solution containing 70 g of ammonium bifluoride dissolved in 1250 mL of water. This mixture was then placed in a vacuum oven and dried overnight at 120° C. under half an atmosphere of vacuum. The final step in producing activated-support was to calcine the material in dry fluidizing air at 454° C. for 6 hours, after which the treated solid oxide was stored under nitrogen until used.

EXAMPLE 7

Preparation of Sulfated Alumina

Ketjen™ alumina, 652 g, was impregnated to just beyond incipient wetness with a solution containing 137 g of $(NH_4)_2SO_4$ dissolved in 1300 mL of water. This mixture was then placed in a vacuum oven and dried overnight at 110° C. under half an atmosphere of vacuum and then calcined in a muffle furnace at 300° C. for 3 hours, then at 450° C. for 3 hours, after which the activated support was screened through an 80 mesh screen. The support was then activated in air at 550° C. for 6 hours, after which the treated solid oxide was stored under nitrogen until used.

EXAMPLE 8

General Description of the Polymerization Runs

Polymerizations were carried out in a 1 gallon Autoclave Engineers stirrer reactor, fitted with an oil-less packing with a flat stirrer running at 700 rpm. The reactor temperature was regulated by controlling the temperature of the water in the steel jacket using steam and water heat exchangers, with electronic instrumentation to control flows. Catalysts were added while the autoclave temperature was below 40° C. under a purge of isobutane. The autoclave was then sealed and 2 L of isobutane were added and stirring started at 700 rpm. Reactor heating was then initiated and as the reactor temperature approached 60° C., ethylene addition was initiated. The hexene was flushed in with the ethylene from an in-line vessel on top of the reactor. The set point temperature and pressure were then rapidly attained. The reactor was held under these conditions for 60 minutes by feeding ethylene on demand. The polymerization was then terminated by venting the volatiles to the flare system. This process left the polyethylene as a wet solid in the reactor, which was collected, and the solid air dried to yield granular polyethylene. Examples 8a–8c of Table 1 illustrate polymerization runs using the catalysts of this invention.

EXAMPLE 9

Comparative Example Using Non-Stannoxy Metallocene Catalyst

In this example, the non-stannoxy half-sandwich metallocene $CpTiCl_3$ was used as a control to compare with the results obtained using the stannoxy-substituted half-sandwich metallocenes of the present invention. The compound $CpTiCl_3$, 7 mg, was mixed with 250 mg of the zinc-impregnated chlorided alumina solid oxide activator (Example 4) in a Diels-Alder tube. Toluene, 4 mL, was added and the mixture was stirred by hand for 5 minutes. This slurry was added to the reactor below 40° C. followed by about half of the isobutene (about 1 L). The reactor heating was started and the remaining isobutane (about 1 L) was used to flush the triisobutylaluminum solution (0.5 mL, 25 wt % in heptane) and 25 gm of 1-hexene from an in-line vessel into the reactor. As the reactor temperature approached 60° C., ethylene addition was begun and the set point of 80° C. was then rapidly attained. The reactor was held at 80° C. for 60 minutes and then the volatiles were vented to the flare system. This procedure left the polyethylene as free flowing solid in the reactor; yield 51.8 gm (7400 gm PE/gm metallocene/hr). The polyethylene produced in this Example had a HLMI of 0.002 gm/10 minutes. Examples 9a and 9b of Table 1 illustrate additional comparative examples using $CpTiCl_3$ as a catalyst.

EXAMPLE 10

Polymerization Process Using $(\eta^5-C_5H_5)Ti[OSn(C_6H_5)_3]Cl_2$ and a Zinc-Impregnated Chlorided Alumina Activator-Support The half-sandwich metallocene ($\eta^5$-cyclopentadienyl)titanium(triphenylstannoxy)dichloride, 0.007 g, was mixed with 250 mg of the zinc-impregnated chlorided alumina solid oxide activator (Example 4) in a Diels-Alder tube. Toluene, 4 mL, was added and the mixture was stirred by hand for 5 minutes. This slurry was added to the reactor below 40° C. followed by about half (about 1 L) of the isobutane. The reactor heating was started and the remaining isobutane (about 1 L) was used to flush the triisobutylaluminum solution (0.5 mL, 25 wt % in heptane) and 25 gm of 1-hexene from an in-line vessel into the reactor. As the reactor approached 60° C., ethylene addition was begun and the set point of 80° C. was then rapidly attained. The reactor was held there for 60 minutes and then the volatiles were vented to the flare system. This procedure left the polyethylene as free flowing solid in the reactor; yield 178.1 gm (25,443 gm PE/gm metallocene/hr). The polyethylene had a HLMI of 0 $\mu$m/10 minutes. See Table 1.

EXAMPLE 11

Polymerization Process Using $(\eta^5-C_5H_5)Ti[OSn(C_6H_5)_3]Cl_2$ and a Zinc-Impregnated Chlorided Alumina Activator-Support in the Presence of Hydrogen The half-sandwich metallocene ($\eta^5$-cyclopentadienyl)titanium-(triphenylstannoxy)dichloride, 7 mg, was mixed with 250 mg of the zinc-impregnated chlorided alumina solid oxide activator (Example 4) in a Diels-Alder tube. Toluene, 4 mL, was added and the mixture was stirred by hand for 5 minutes. This slurry was added to the reactor below 40° C. followed by about half of the isobutene (about 1 L). The reactor heating was started and the remaining isobutane (about 1 L) was used to flush the triisobutylaluminum solution (0.5 mL, 25 wt % in heptane) and 25 gm of 1-hexene from an in-line vessel into the reactor. In this run, the effect of adding hydrogen to the reaction was determined by adding a 175 psi pressure drop measured off of a 300 mL cylinder of hydrogen to the reactor. As the reactor approached 60° C., ethylene addition was begun and the set point of 80° C. was then rapidly attained. The reactor was held there for 60 minutes and then the volatiles were vented to the flare system. This procedure left the polyethylene as free flowing solid in the reactor; yield 99.6 gm. The polyethylene had a MI of 0.366 gm/10 minutes and a HLMI of 19.4 gm/10 minutes. See Table 1.

EXAMPLE 12

Polymerization Process Using $(\eta^5\text{-}C_5H_5)Ti[OSn(C_6H_5)_3]Cl_2$ and a Fluorided Silica-Alumina Activator-Support The half-sandwich metallocene ($\eta^5$-cyclopentadienyl)titanium(triphenylstannoxy)dichloride, 7 mg, was mixed with 250 mg of the fluorided silica-alumina activator-support from Example 6 in a Diels-Alder tube. Toluene, 4 mL, was added and the mixture was stirred by hand for 5 minutes. This slurry was added to the reactor below 40° C. followed by about half of the isobutene (about 1 L). The reactor heating was initiated and the remaining isobutene (about 1 L) was used to flush the triisobutylaluminum solution (0.5 mL, 25 wt % in heptane) and 25 gm of 1-hexene from an in-line vessel into the reactor. As the reactor temperature approached 60° C., ethylene addition was begun and the set point of 100° C. was then rapidly attained. The reactor was held there for 60 minutes and then the volatiles were vented to the flare system. This procedure left the polyethylene as free flowing solid in the reactor; yield 16.6 gm. The polyethylene had a HLMI of 0.006 gm/10 minutes. See Table 1.

EXAMPLE 13

Polymerization Process Using $(\eta^5\text{-}C_5H_5)Ti[OSn(C_6H_5)_3]Cl_2$ and a Sulfated Alumina Activator-Support The half-sandwich metallocene ($\eta^5$-cyclopentadienyl)titanium(triphenylstannoxy)dichloride, 7 mg, was mixed with 250 mg of the sulfated alumina activator-support from Example 7 in a Diels-Alder tube. Toluene, 4 mL, was added and the mixture was stirred by hand for 5 minutes. This slurry was added to the reactor below 40° C. followed by about half of the isobutene (about 1 L). The reactor heating was initiated and the remaining isobutane (about 1 L) was used to flush the triisobutylaluminum solution (0.5 mL, 25 wt % in heptane) and 25 gm of 1-hexene from an in-line vessel into the reactor. As the reactor approached 60° C., ethylene addition was begun and the set point of 80 C was then rapidly attained. The reactor was held there for 60 minutes and then the volatiles were vented to the flare system. This procedure left the polyethylene as free flowing solid in the reactor; yield 7 gm. The polyethylene had a HLMI of 0.023 gm/10 minutes. See Table 1.

EXAMPLE 14

Polymerization Process Using $(\eta^5\text{-}C_5H_5)Ti[OSn(C_6H_5)_3]Cl_2$ and a Sulfated Alumina Activator-Support in the Absence of 1-Hexene The half-sandwich metallocene ($\eta^5$-cyclopentadienyl)titanium(triphenylstannoxy)dichloride, 7 mg, was mixed with 250 mg of the sulfated alumina activator-support from Example 7 in a Diels-Alder tube. Toluene, 4 mL, was added and the mixture was stirred by hand for 5 minutes. This slurry was added to the reactor below 40° C. followed by about half of the isobutene (about 1 L). The reactor heating was initiated and the remaining isobutane (about 1 L) was used to flush the triisobutylaluminum solution (0.5 mL, 25 wt % in heptane) from an in-line vessel into the reactor. In this run, no 1-hexene was added to the reaction. As the reactor approached 60° C., ethylene addition was begun and the set point of 100° C. was then rapidly attained. The reactor was held there for 60 minutes and then the volatiles were vented to the flare system. This procedure left the polyethylene as free flowing solid in the reactor; yield 13 gm. See Table 1.

EXAMPLE 15

Polymerization Process Using $(\eta^5\text{-}C_5H_5) Ti[OSn(CH_5)_3]Cl_2$ and Methylaluminoxane Activator To a 1 gallon Autoclave Engineers stirrer reactor fitted with an oil-less packing, 10 mL of methylaluminoxane (10% in Toluene) were added while maintaining below 40° C. under a purge of isobutane. The half-sandwich metallocene ($\eta^5$-cyclopentadienyl)titanium(triphenylstannoxy)dichloride, 7 mg, was then charged to the autoclave. The autoclave was sealed and 2 L of isobutane were added and stirring started at 700 rpm. The reactor heating was then initiated. As the reactor approached 60° C., ethylene addition was begun. The 25 grams of 1-hexene were flushed in with the ethylene from an in-line vessel on top of the reactor. The set point of 80° C. and 450 psig was then rapidly attained. The reactor was held there for 60 minutes by feeding ethylene on demand. The polymerization was terminated by then venting the volatiles to the flare system. This procedure left the polyethylene as a wet solid in the reactor. The polyethylene solid was air dried to yield 10.0 grams of product. A similar polymerization run (Example 15a) was carried out using MAO in combination with a chlorided zinc alumina, prepared as in Example 4. The results of both runs are presented in Table 1.

TABLE 1

| Example No. | Catalyst[a] | Reaction Time (min) | Temp. (C.) | Ethylene (psig) | $H_2$ ($\Delta$psi)[b] | Co-monomer | Co-monomer Wt. (g) | Activator[c] | Activator Wt. (mg) | TIBAL (mL)[d] |
|---|---|---|---|---|---|---|---|---|---|---|
| 10 | a | 60 | 80 | 450 | 0 | hexene | 25.0 | w | 250 | 0.5 |
| 11 | a | 60 | 80 | 450 | 175 | hexene | 25.0 | w | 250 | 0.5 |
| 12 | a | 60 | 100 | 550 | 0 | — | 0.0 | y | 250 | 0.5 |
| 13 | a | 60 | 80 | 450 | 0 | hexene | 25.0 | x | 250 | 0.5 |
| 14 | a | 60 | 100 | 550 | 0 | — | 0.0 | x | 250 | 0.5 |
| 15 | a | 60 | 80 | 450 | 0 | hexene | 25.0 | — | — | 10 mL MAO |
| 15a | a | 60 | 80 | 450 | 0 | hexene | 25.0 | w | 250 | 10 mL MAO |
| 8a | a | 61 | 80 | 450 | 0 | hexene | 25.0 | w | 250 | 0.5 |

TABLE 1-continued

| | | | | | | | | | | |
|---|---|---|---|---|---|---|---|---|---|---|
| 8b | a | 32 | 80 | 450 | 0 | hexene | 25.0 | z | 250 | |
| 8c | a | 60 | 90 | 450 | 0 | hexene | 20.0 | x | 250 | 0.5 |
| | | | | | Controls | | | | | |
| 9 | b | 60 | 80 | 450 | 0 | hexene | 25.0 | w | 250 | 0.5 |
| 9a | b | 60 | 80 | 450 | 0 | hexene | 25.0 | w | 250 | 0.5 |
| 9b | b | 60 | 80 | 450 | 132 | hexene | 25.0 | w | 250 | 0.5 |

| Example No. | Cat. Wt. (g) | Solid PE (g) | Productivity (g/g) | Catalyst Activity (g/g/hr) | Activator Activity (g/g/hr) | MI (g/10 min) | HLMI (g/10 min) |
|---|---|---|---|---|---|---|---|
| 10 | 0.0070 | 178.1 | 25443 | 25443 | 712 | 0.000 | 0.0000 |
| 11 | 0.0070 | 99.6 | 14229 | 14229 | 398 | 0.366 | 19.4 |
| 12 | 0.0070 | 16.6 | 2370 | 2370 | 66 | 0.000 | 0.0060 |
| 13 | 0.0070 | 7.0 | 1000 | 1000 | 28 | 0.000 | 0.0230 |
| 14 | 0.0070 | 13.0 | 1857 | 1857 | 52 | | |
| 15 | 0.0070 | 10.0 | 1429 | 1429 | | | |
| 15a | 0.0070 | 34.5 | 4929 | 4929 | 138 | 0.000 | 0.0160 |
| 8a | 0.0070 | 177.9 | 25414 | 24998 | 700 | 0.00 | 0.0 |
| 8b | 0.0100 | 0.8 | 80 | 150 | 6 | | |
| 8c | 0.0100 | 6.4 | 640 | 640 | 26 | | |
| | | | Controls | | | | |
| 9 | 0.0070 | 51.8 | 7400 | 7400 | 207 | 0.00 | 0.002 |
| 9a | 0.0120 | 88.0 | 7333 | 7333 | 352 | | 0.0 |
| 9b | 0.0070 | 72.6 | 10371 | 10371 | 290 | | 1.0 |

[a] Catalyst a is $CpCl_2Ti(OSnPh_3)$; and b is $CpTiCl_3$.
[b] Pressure drop (psi) in a 300 mL cylinder of $H_2$ to reactor.
[c] Activator w is chlorided Zn-impregnated Ketjen B alumina (100–200 mesh), prepared as in Example 4; x is sulfated Ketjen L alumina, prepared as in Example 7; y is fluorided silica-alumina, prepared as in Example 6; and z is $Zn(NO_3)_2 + NH_4HF_2$ treated silica-alumina.
[d] Used as a 25 weight % solution in heptane.

We claim:

1. A compound having the following formula:

$(X^1)(X^2)(X^3)(X^4)M^1$; wherein $M^1$ is selected from titanium, zirconium, or hafnium;

$(X^1)$ is selected from cyclopentadienyl, indenyl, fluorenyl, substituted cyclopentadienyl, substituted indenyl, or substituted fluorenyl;

each substituent on the substituted cyclopentadienyl, substituted indenyl, or substituted fluorenyl $(X^1)$ is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen;

$(X^2)$ is selected from a stannoxy group with the following formula:

—$OSnR_3$;

wherein R is independently selected from alkyl, cycloalkyl, aryl, aralkyl, substituted alkyl, substituted aryl, or substituted aralkyl, any one of which having from 1 to about 20 carbon atoms; OR' wherein R' is selected from alkyl, aryl, aralkyl, substituted alkyl, substituted aryl, or substituted aralkyl, any one of which having from 1 to about 20 carbon atoms; F; Cl; Br; or I; and $(X^3)$ and $(X^4)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide.

2. The compound of claim 1, wherein the compound has the following general formula:

($\eta^5$-cycloalkadienyl)M(OSnR$_3$)X$_2$; wherein cycloalkadienyl is selected from cyclopentadienyl, indenyl, fluorenyl, or substituted analogs thereof;

M is selected from Ti, Zr, or Hf;

R is independently selected from substituted or non-substituted alkyl, cycloalkyl, aryl, aralkyl, alkoxide, or aryloxide, any one of which having from 1 to about 20 carbon atoms; F; Cl; Br; or I; and X is independently selected from F; Cl; Br; I; or a substituted or non-substituted alkyl, cycloalkyl, aryl, aralkyl, alkoxide, or aryloxide, any one of which having from 1 to about 20 carbon atoms.

3. The compound of claim 1, wherein the compound is selected from:

($\eta^5$-cyclopentadienyl)titanium(triphenylstannoxy)dichloride;

($\eta^5$-cyclopentadienyl)zirconium(triphenylstannoxy)dichloride;

($\eta^5$-cyclopentadienyl)titanium(trimethylstannoxy)dichloride;

($\eta^5$-cyclopentadienyl)zirconium(triethylstannoxy)dichloride;

($\eta^5$-cyclopentadienyl)hafnium(triphenylstannoxy)dichloride;

($\eta^5$-cyclopentadienyl)titanium(tri-n-butylstannoxy)dichloride;

($\eta^5$-cyclopentadienyl)titanium(triphenylstannoxy)dibromide;

($\eta^5$-pentamethylcyclopentadienyl)titanium(triphenylstannoxy)dibromide; or ($\eta^5$-cyclopentadienyl)titanium(tributylstannoxy)dibromide.

4. A composition of matter comprising a half-sandwich metallocene compound with the following formula:

$(X^1)(X^2)(X^3)(X^4)M^1$; wherein $M^1$ is selected from titanium, zirconium, or hafnium;

($X^1$) is selected from cyclopentadienyl, indenyl, fluorenyl, substituted cyclopentadienyl, substituted indenyl, or substituted fluorenyl;

each substituent on the substituted cyclopentadienyl, substituted indenyl, or substituted fluorenyl ($X^1$) is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen;

($X^2$) is selected from a stannoxy group with the following formula:

—OSnR$_3$;

wherein R is independently selected from alkyl, cycloalkyl, aryl, aralkyl, substituted alkyl, substituted aryl, or substituted aralkyl, any one of which having from 1 to about 20 carbon atoms; OR' wherein R' is selected from alkyl, aryl, aralkyl, substituted alkyl, substituted aryl, or substituted aralkyl, any one of which having from 1 to about 20 carbon atoms; F; Cl; Br; or I; and ($X^3$) and ($X^4$) are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide.

5. A catalyst composition comprising a half-sandwich metallocene compound with the following formula:

$(X^1)(X^2)(X^3)(X^4)M^1$; wherein $M^1$ is selected from titanium, zirconium, or hafnium;

($X^1$) is selected from cyclopentadienyl, indenyl, fluorenyl, substituted cyclopentadienyl, substituted indenyl, or substituted fluorenyl;

each substituent on the substituted cyclopentadienyl, substituted indenyl, or substituted fluorenyl ($X^1$) is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen;

($X^2$) is selected from a stannoxy group with the following formula:

—OSnR$_3$;

wherein R is independently selected from alkyl, cycloalkyl, aryl, aralkyl, substituted alkyl, substituted aryl, or substituted aralkyl, any one of which having from 1 to about 20 carbon atoms; OR' wherein R' is selected from alkyl, aryl, aralkyl, substituted alkyl, substituted aryl, or substituted aralkyl, any one of which having from 1 to about 20 carbon atoms; F; Cl; Br; or I; and ($X^3$) and ($X^4$) are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide.

6. A catalyst composition comprising:

a) a half-sandwich metallocene compound with the following formula:

$(X^1)(X^2)(X^3)(X^4)M^1$; wherein $M^1$ is selected from titanium, zirconium, or hafnium;

($X^1$) is selected from cyclopentadienyl, indenyl, fluorenyl, substituted cyclopentadienyl, substituted indenyl, or substituted fluorenyl;

each substituent on the substituted cyclopentadienyl, substituted indenyl, or substituted fluorenyl ($X^1$) is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen;

($X^2$) is selected from a stannoxy group with the following formula:

—OSnR$_3$;

wherein R is independently selected from alkyl, cycloalkyl, aryl, aralkyl, substituted alkyl, substituted aryl, or substituted aralkyl, any one of which having from 1 to about 20 carbon atoms; OR' wherein R' is selected from alkyl, aryl, aralkyl, substituted alkyl, substituted aryl, or substituted aralkyl, any one of which having from 1 to about 20 carbon atoms; F; Cl; Br; or I; and ($X^3$) and ($X^4$) are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide; and b) a chemically-treated solid oxide comprising a solid oxide treated with an electron-withdrawing anion;

wherein the solid oxide is selected from silica, alumina, silica-alumina, aluminum phosphate, heteropolytungstates, titania, zirconia, magnesia, boria, zinc oxide, mixed oxides thereof, or mixtures thereof; and the electron-withdrawing anion is selected from fluoride, chloride, bromide, phosphate, triflate, bisulfate, sulfate, or any combination thereof.

7. The catalyst composition of claim 6, wherein the chemically-treated solid oxide further comprises a metal or metal ion.

8. The catalyst composition of claim 6, wherein the chemically-treated solid oxide further comprises a metal or metal ion, and wherein the chemically-treated solid oxide is selected from zinc-impregnated chlorided alumina, zinc-impregnated fluorided alumina, zinc-impregnated chlorided silica-alumina, zinc-impregnated fluorided silica-alumina, zinc-impregnated sulfated alumina, or any combination thereof.

9. The catalyst composition of claim 6, wherein the chemically-treated solid oxide further comprises a metal or metal ion selected from zinc, nickel, vanadium, silver, copper, gallium, tin, tungsten, molybdenum, or any combination thereof.

10. The catalyst composition of claim 6, wherein the chemically-treated solid oxide comprises fluorided silica alumina which comprises from about 5% to about 95% by weight alumina and from about 2% to about 50% by weight fluoride ion, based on the weight of the fluorided silica-alumina after drying but before calcining.

11. The catalyst composition of claim 6, wherein the chemically-treated solid oxide is selected from fluorided alumina, chlorided alumina, bromided alumina, fluorided silica-alumina, chlorided silica-alumina, sulfated alumina, sulfated silica-alumina, or a combination thereof.

12. A catalyst composition comprising:

a) a half-sandwich metallocene compound with the following formula:

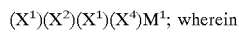

$M^1$ is selected from titanium, zirconium, or hafnium;

$(X^1)$ is selected from cyclopentadienyl, indenyl, fluorenyl, substituted cyclopentadienyl, substituted indenyl, or substituted fluorenyl;

each substituent on the substituted cyclopentadienyl, substituted indenyl, or substituted fluorenyl $(X^1)$ is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen;

$(X^2)$ is selected from a stannoxy group with the following formula:

wherein R is independently selected from alkyl, cycloalkyl, aryl, aralkyl, substituted alkyl, substituted aryl, or substituted aralkyl, any one of which having from 1 to about 20 carbon atoms; OR' wherein R' is selected from alkyl, aryl, aralkyl, substituted alkyl, substituted aryl, or substituted aralkyl, any one of which having from 1 to about 20 carbon atoms; F; Cl; Br; or I; and $(X^3)$ and $(X^4)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide; and b) an organoaluminum compound with the following formula:

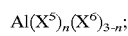

wherein $(X^5)$ is a hydrocarbyl having from 1 to about 20 carbon atoms; $(X^6)$ is selected from alkoxide or aryloxide, any one of which having from 1 to about 20 carbon atoms, halide, or hydride; and n is a number from 1 to 3, inclusive.

13. A catalyst composition comprising:

a) a half-sandwich metallocene compound with the following formula:

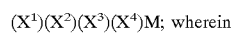

$M^1$ is selected from titanium, zirconium, or hafnium;

$(X^1)$ is selected from cyclopentadienyl, indenyl, fluorenyl, substituted cyclopentadienyl, substituted indenyl, or substituted fluorenyl;

each substituent on the substituted cyclopentadienyl, substituted indenyl, or substituted fluorenyl $(X^1)$ is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen;

$(X^2)$ is selected from a stannoxy group with the following formula:

wherein R is independently selected from alkyl, cycloalkyl, aryl, aralkyl, substituted alkyl, substituted aryl, or substituted aralkyl, any one of which having from 1 to about 20 carbon atoms; OR' wherein R' is selected from alkyl, aryl, aralkyl, substituted alkyl, substituted aryl, or substituted aralkyl, any one of which having from 1 to about 20 carbon atoms; F; Cl; Br; or I; and $(X^3)$ and $(X^4)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide; and b) an activator selected from an aluminoxane, an organoboron compound, an ionizing ionic compound, a clay material, a chemically-treated solid oxide combined with an organoaluminum compound, or any combination thereof.

14. The catalyst composition of claim 13, wherein the activator comprises an aluminoxane comprising:

a cyclic aluminoxane having the formula:

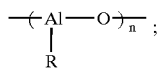

wherein
R is a linear or branched alkyl having from 1 to 10 carbon atoms, and n is an integer from 3 to about 10;
a linear aluminoxane having the formula:

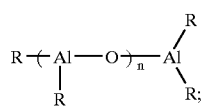

wherein
R is a linear or branched alkyl having from 1 to 10 carbon atoms, and n is an integer from 1 to about 50;
a cage aluminoxane having the formula $R^t_{5m+\alpha}R^b_{m-\alpha}Al_{4m}O_{3m}$, wherein m is 3 or 4 and α is=$n_{Al(3)}-n_{O(2)}+n_{O(4)}$; wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ represents a terminal alkyl group, and $R^b$ represents a bridging alkyl group; wherein R is a linear or branched alkyl having from 1 to 10 carbon atoms; or
any combination thereof.

15. The catalyst composition of claim 14, wherein the molar ratio of the aluminum in the alumixoane to the half-sandwich metallocene in the composition is from about 1:1 to about 100,000:1.

16. The catalyst composition of claim 13, wherein the activator comprises an aluminoxane selected from methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, iso-pentylaluminoxane, neopentylaluminoxane, or any combination thereof.

17. The catalyst composition of claim 13, wherein the activator comprises an organoboron compound selected from tris(pentafluorophenyl)boron, tris[3,5-bis(trifluoromethyl)phenyl]boron, or a combination thereof.

18. The catalyst composition of claim 17, wherein the molar ratio of the organoboron compound to the half-sandwich metallocene in the composition is from about 0.5:1 to about 10:1.

19. The catalyst composition of claim 13, wherein the activator comprises an ionizing ionic compound selected from tri(n-butyl)ammonium tetrakis(p-tolyl)borate, tri(n-butyl)ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoromethyl)phenyl] borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis(trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, triphenylcarbenium tetrakis[3,5-bis(trifluoromethyl)phenyl]borate, triphenylcarbenium tetrakis(pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis[3,5-bis(trifluoromethyl)phenyl]borate, tropylium tetrakis(pentafluorophenyl)borate, lithium tetrakis(pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate borate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, potassium tetrafluoroborate, tri(n-butyl)ammonium tetrakis(p-tolyl)aluminate, tri(n-butyl)ammonium tetrakis(m-tolyl)aluminate, tri(n-butyl)ammonium tetrakis(2,4-dimethylpheny)aluminate, tri(n-butyl)ammonium tetrakis(3,5-dimethylphenyl)aluminate, tri(n-butyl) ammonium tetrakis(pentafluorophenyl)aluminate, N,N-dimethylanilinium tetrakis(p-tolyl)aluminate, N,N-dimethylanilinium tetrakis(m-tolyl)aluminate, N,N-dimethylanilinium tetrakis(2,4-dimethylphenyl)aluminate, N,N-dimethylanilinium tetrakis(3,5-dimethylphenyl)aluminate, N,N-dimethylanilinium tetrakis(pentafluorophenyl)aluminate, triphenylcarbenium tetrakis(p-tolyl)aluminate, triphenylcarbenium tetrakis(m-tolyl)aluminate, triphenylcarbenium tetrakis(2,4-dimethylphenyl)aluminate, triphenylcarbenium tetrakis(3,5-dimethylphenyl)aluminate, triphenylcarbenium tetrakis(pentafluorophenyl)aluminate, tropylium tetrakis(p-tolyl)aluminate, tropylium tetrakis(m-tolyl)aluminate, tropylium tetrakis(2,4-dimethylphenyl)aluminate, tropylium tetrakis(3,5-dimethylphenyl)aluminate, tropylium tetrakis(pentafluorophenyl)aluminate, lithium tetrakis(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl) aluminate, potassium tetrakis(2,4-dimethylphenyl) aluminate, potassium tetrakis(3,5-dimethylphenyl) aluminate, potassium tetrafluoroaluminate, or any combination thereof.

20. A catalyst composition comprising:
   a) a half-sandwich metallocene compound with the following formula:

$(X^1)(X^2)(X^1)(X^4)M^1$; wherein $M^1$ is selected from titanium, zirconium, or hafnium;
   ($X^1$) is selected from cyclopentadienyl, indenyl, fluorenyl, substituted cyclopentadienyl, substituted indenyl, or substituted fluorenyl;
   each substituent on the substituted cyclopentadienyl, substituted indenyl, or substituted fluorenyl ($X^1$) is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen;
   ($X^2$) is selected from a stannoxy group with the following formula:

—$OSnR_3$;

wherein R is independently selected from alkyl, cycloalkyl, aryl, aralkyl, substituted alkyl, substituted aryl, or substituted aralkyl, any one of which having from 1 to about 20 carbon atoms; OR' wherein R' is selected from alkyl, aryl, aralkyl, substituted alkyl, substituted aryl, or substituted aralkyl, any one of which having from 1 to about 20 carbon atoms; F; Cl; Br; or I; and
   ($X^3$) and ($X^4$) are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide;
   b) a chemically-treated solid oxide comprising a solid oxide treated with an electron-withdrawing anion, wherein
   the solid oxide is selected from silica, alumina, silica-alumina, aluminum phosphate, heteropolytungstates, titania, zirconia, magnesia, boria, zinc oxide, mixed oxides thereof, or mixtures thereof; and
   the electron-withdrawing anion is selected from fluoride, chloride, bromide, phosphate, triflate, bisulfate, sulfate, or combinations thereof; and
   c) an organoaluminum compound with the following formula:

$Al(X^5)_n(X^6)_{3-n}$;

wherein ($X^5$) is a hydrocarbyl having from 1 to about 20 carbon atoms; ($X^6$) is selected from alkoxide or aryloxide, any one of which having from 1 to about 20 carbon atoms, halide, or hydride; and n is a number from 1 to 3, inclusive.

21. The catalyst composition of claim 20, wherein the weight ratio of the organoalumium compound to chemically-treated solid oxide is from about 5:1 to about 1:1000.

22. The catalyst composition of claim 20, wherein the weight ratio of the chemically-treated solid oxide to the half-sandwich metallocene compound is from about 10,000:1 to about 1:1.

23. The catalyst composition of claim 20, wherein:
   the solid oxide is selected from silica, alumina, silica-alumina, or mixtures thereof;
   the electron-withdrawing anion is selected from fluoride, chloride, bromide, phosphate, triflate, bisulfate, sulfate, or any combination thereof; and
   the organoalumium compound is selected from trimethylaluminum (TMA) triethylaluminum (TEA), tripropylaluminum, diethylaluminum ethoxide, tributylaluminum, disobutylaluminum hydride, triisobutylaluminum (TIBAL), diethylaluminum chloride, or any combination thereof.

24. The catalyst composition of claim 20, wherein the half-sandwich metallocene comprises $(\eta^5$-$C_5H_5)$Ti(OS-nPh$_3$)Cl$_2$, the chemically-treated solid oxide comprises chlorided zinc-alumina, and the organoaluminum compound comprises triisobutylaluminum (TIBAL).

25. A process to produce a catalyst composition comprising contacting a half-sandwich metallocene compound and an activator, wherein:
   a) the half-sandwich metallocene compound has the following formula:

$(X^1)(X^2)(X^3)(X^4)M^1$; wherein $M^1$ is selected from titanium, zirconium, or hafnium;
   ($X^1$) is selected from cyclopentadienyl, indenyl, fluorenyl, substituted cyclopentadienyl, substituted indenyl, or substituted fluorenyl;
   each substituent on the substituted cyclopentadienyl, substituted indenyl, or substituted fluorenyl ($X^1$) is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen;
   ($X^2$) is selected from a stannoxy group with the following formula:

—$OSnR_3$;

wherein R is independently selected from alkyl, cycloalkyl, aryl, aralkyl, substituted alkyl, substituted aryl, or substituted aralkyl, any one of which having from 1 to about 20 carbon atoms; OR' wherein R' is selected from alkyl, aryl, aralkyl, substituted alkyl, substituted aryl, or substituted aralkyl, any one of which having from 1 to about 20 carbon atoms; F; Cl; Br; or I; and
   ($X^3$) and ($X^4$) are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide; and
   b) the activator is selected from an aluminoxane, an organoboron compound, an ionizing ionic compound, a clay material, a chemically-treated solid oxide combined with an organoaluminum compound, or any combination thereof.

26. A process for polymerizing olefins comprising contacting a catalyst composition with at least one type of olefin monomer, wherein the catalyst composition comprises a half-sandwich metallocene compound with the following formula:

$(X^1)(X^2)(X^1)(X^4)M^1$; wherein $M^1$ is selected from titanium, zirconium, or hafnium;

$(X^1)$ is selected from cyclopentadienyl, indenyl, fluorenyl, substituted cyclopentadienyl, substituted indenyl, or substituted fluorenyl;

each substituent on the substituted cyclopentadienyl, substituted indenyl, or substituted fluorenyl $(X^1)$ is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; a halide; or hydrogen;

$(X^2)$ is selected from a stannoxy group with the following formula:

—OSnR$_3$;

wherein R is independently selected from alkyl, cycloalkyl, aryl, aralkyl, substituted alkyl, substituted aryl, or substituted aralkyl, any one of which having from 1 to about 20 carbon atoms; OR' wherein R' is selected from alkyl, aryl, aralkyl, substituted alkyl, substituted aryl, or substituted aralkyl, any one of which having from 1 to about 20 carbon atoms; F; Cl; Br; or I; and $(X^3)$ and $(X^4)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any one of which having from 1 to about 20 carbon atoms; or a halide.

* * * * *